United States Patent
Itoh et al.

[11] Patent Number: 5,967,279
[45] Date of Patent: Oct. 19, 1999

[54] HUB CLUTCH ASSEMBLY

[75] Inventors: Kenichiro Itoh, Iwata-gun; Takayuki Norimatsu, Hamamatsu; Isao Hori, Iwata; Katsuhisa Suzuki, Hamamatsu; Kenro Adachi, Iwata-gun; Koji Akiyoshi, Hamamatsu, all of Japan

[73] Assignee: NTN Corporation, Osaka, Japan

[21] Appl. No.: 09/181,995

[22] Filed: Oct. 29, 1998

Related U.S. Application Data

[62] Division of application No. 08/703,459, Aug. 27, 1996.

[30] Foreign Application Priority Data

| Aug. 28, 1995 | [JP] | Japan | 7-218921 |
| Aug. 28, 1995 | [JP] | Japan | 7-218945 |
| Oct. 31, 1995 | [JP] | Japan | 7-283840 |

[51] Int. Cl.[6] ............................................. B60K 23/00
[52] U.S. Cl. ...................... 192/69.41; 180/247; 192/48.3; 192/69.42; 192/88 A
[58] Field of Search ........................... 192/69.41, 69.42, 192/88 A, 85 V, 43.2, 45.1, 41 A, 48.3, 48.92, 49, 50; 188/247

[56] References Cited

U.S. PATENT DOCUMENTS

| 2,948,557 | 8/1960 | Howe et al. . |
| 3,753,479 | 8/1973 | Williams . |
| 4,271,722 | 6/1981 | Campbell . |
| 4,282,949 | 8/1981 | Kopich et al. . |
| 4,381,828 | 5/1983 | Lunn et al. . |
| 4,407,387 | 10/1983 | Lindbert . |
| 4,452,331 | 6/1984 | Lunn et al. . |
| 4,625,846 | 12/1986 | Gomez . |
| 4,627,512 | 12/1986 | Clohessy . |
| 4,960,192 | 10/1990 | Kurihara . |
| 5,085,304 | 2/1992 | Barroso . |
| 5,148,901 | 9/1992 | Kurihara et al. . |
| 5,219,054 | 6/1993 | Teraoka . |

Primary Examiner—Charles A. Marmor
Assistant Examiner—Saúl J. Rodriguez
Attorney, Agent, or Firm—Wenderoth, Lind & Ponack, L.L.P.

[57] ABSTRACT

A hub clutch assembly is designed so that fluid pressure is used only while the driving mode is being changed over between a four-wheel drive position and a two-wheel drive position, while eliminating the necessity of holding a coupling member in position once the driving mode has been changed over. A driven member and a driving member are coupled together and uncoupled from each other by a slider which is moved under a negative or positive air pressure. A spring is used to maintain the slider in the two-wheel drive position, while a magnet is used to maintain the slider in the four-wheel drive position.

5 Claims, 23 Drawing Sheets

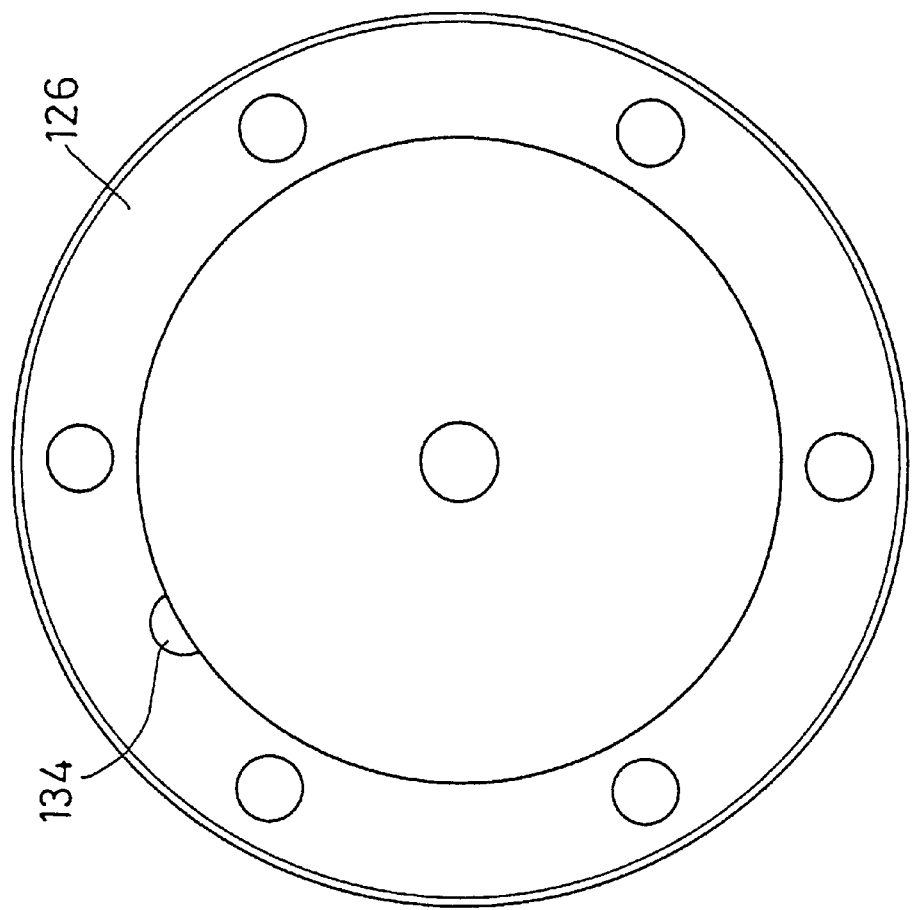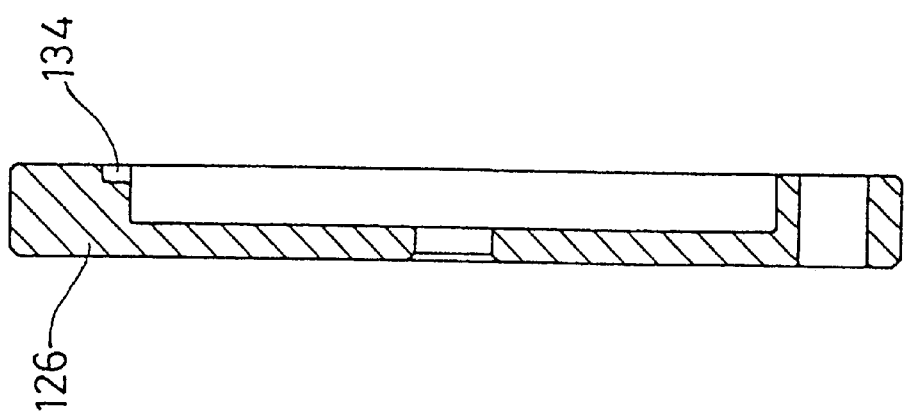

HUB CLUTCH ASSEMBLY

This is a divisional application of Ser. No. 08/703,459, filed Aug. 27, 1996.

BACKGROUND OF THE INVENTION

This invention relates to a hub clutch assembly mounted on each front wheel of a four-wheel drive vehicle to selectively transrat and cut off driving force between the front wheel axle and the wheel hub of each front wheel.

A part-time four-wheel drive vehicle has a hub clutch assembly mounted between each front wheel hub and the front wheel axle to selectively transmit driving force to the front wheels.

A conventional hub clutch assembly has a slide gear axially slidably mounzed on the axle. By sliding the slide gear into engagement with the wheel hub, the driving mode is changed over to the four-wheel drive position. By disengaging the slide gear from the wheel hub, the driving mode changes over to the two-wheel drive position. Fluid pressure such as air pressure is used to move the slide gear between these two positions.

The arrangement in which air pressure is used to move the slide gear has a problem in that air pressure has to be maintained at all times in order to hold the driving mode either in the four-wheel drive position or the two-wheel drive position. Since air pressure is always acting on seals of the hub and the spindle, they tend to be worn quickly. Their durability is thus extremely low.

An object of this invention is to provide a hub clutch assembly in which fluid pressure is used only while the driving mode is being changed over between four-wheel and two-wheel drive positions, thereby eliminating the necessity of keeping the fluid pressure to hold the coupling members in position once the driving mode has been changed over, to improve the durability of the seal members.

SUMMARY OF THE INVENTION

According to this invention, there is provided a hub clutch assembly comprising a driving member coupled to a wheel axle, a driven member coupled to a wheel hub, the driving member and the driven member being mounted one around the other so as to be rotatable relative to each other, engaging elements mounted between the driving member and the driven member and adapted to engage both the driving member and the driven member when the driving member and the driven member rotate relative to each other, a retainer for the engaging elements mounted between the driving member and the driven member so as to be rotatable relative to both the driving member and the driven member, a torque imparting means coupled to the retainer rotating the retainer relative to the driving member to move the engaging elements to an operative engageable position, a coupling means mounted between the retainer and the driven member so as to be movable under a fluid pressure between a first position where the retainer and the driven member are coupled together through the coupling means and a second position where the retainer and the driven member are separated from each other, a spring for resiliently holding the coupling means in one of the first and second positions, and a magnet for magnetically holding the coupling means in the other of the first and second positions.

A negative or positive air pressure is used to move the coupling member between the four-wheel drive and two-wheel drive positions. Once the driving mode has been changed over, pressure is returned from the negative or positive pressure to the atmospheric pressure. Biasing force of the spring is used to maintain the four-wheel drive position, while the two-wheel drive position is maintained by attracting the lid of the driven member or the driving member with the magnet. Since fluid pressure is used only for a short time, seal members can maintain high durability. This makes it possible to use ordinary seal members.

During the four-wheel drive mode, rotation of the front wheel axle is transmitted to each front wheel hub through the sprags mounted between the driving member and the outer ring. When the wheel hub begins to rotate faster than the axle, it stops free-running, so that the engine brake is applied to the front wheels.

By mounting the hub clutch assembly according to this invention between each front wheel of a four-wheel drive vehicle and its front wheel axle, the driving mode can be easily changed over between the two-wheel and four-wheel drive positions. During the two-wheel drive mode, the drive train leading to the front wheels is cut off from the engine. During the four-wheel drive mode, all the four wheels are coupled together. In either mode, both fuel consumption and noise level are low. The vehicle can travel on various kinds of road surfaces stably and smoothly.

Other features and objects of the present invention wil become apparent from the following description made with reference to the accompanying drawings, in which:

BRIEF DESCRIPTION OF THE DRAWINGS

FIG. 22A is a vertical sectional view of a lid;

FIG. 22B is a front view; of the lid of FIG. 22A

DETAILED DESCRIPTION OF THE PREFERRED EMBODIMENT

Figure 1:
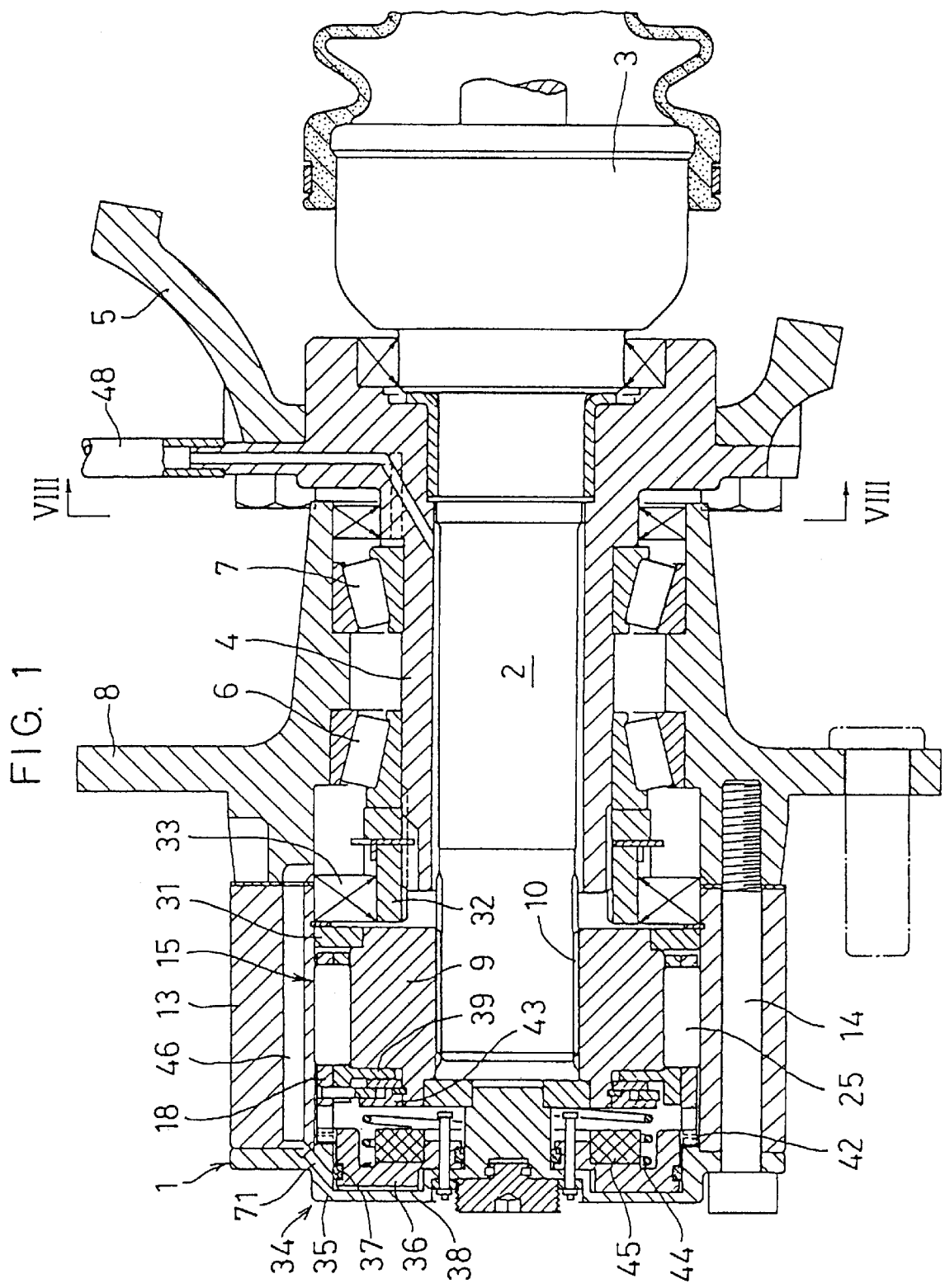
FIG. 1 is a partially sectional view of a first embodiment of a hub clutch assembly mounted on a four-wheel drive vehicle.

Embodiments of this invention are described with reference to the drawings.

(First Embodiment)

In the first embodiment shown in FIGS. 1–8, numeral 1 designates a hub clutch assembly. Numeral 2 indicates a front wheel axle of a four-wheel drive vehicle. It is actually a shaft of a homokinetic joint 3 coupled to a drive train of the vehicle.

The front wheel axle 2 carries a spindle 4 fixed to a knuckle 5 of the vehicle to rotatably support a wheel hub 8 through tapered bearings 6 and 7.

Figure 2:
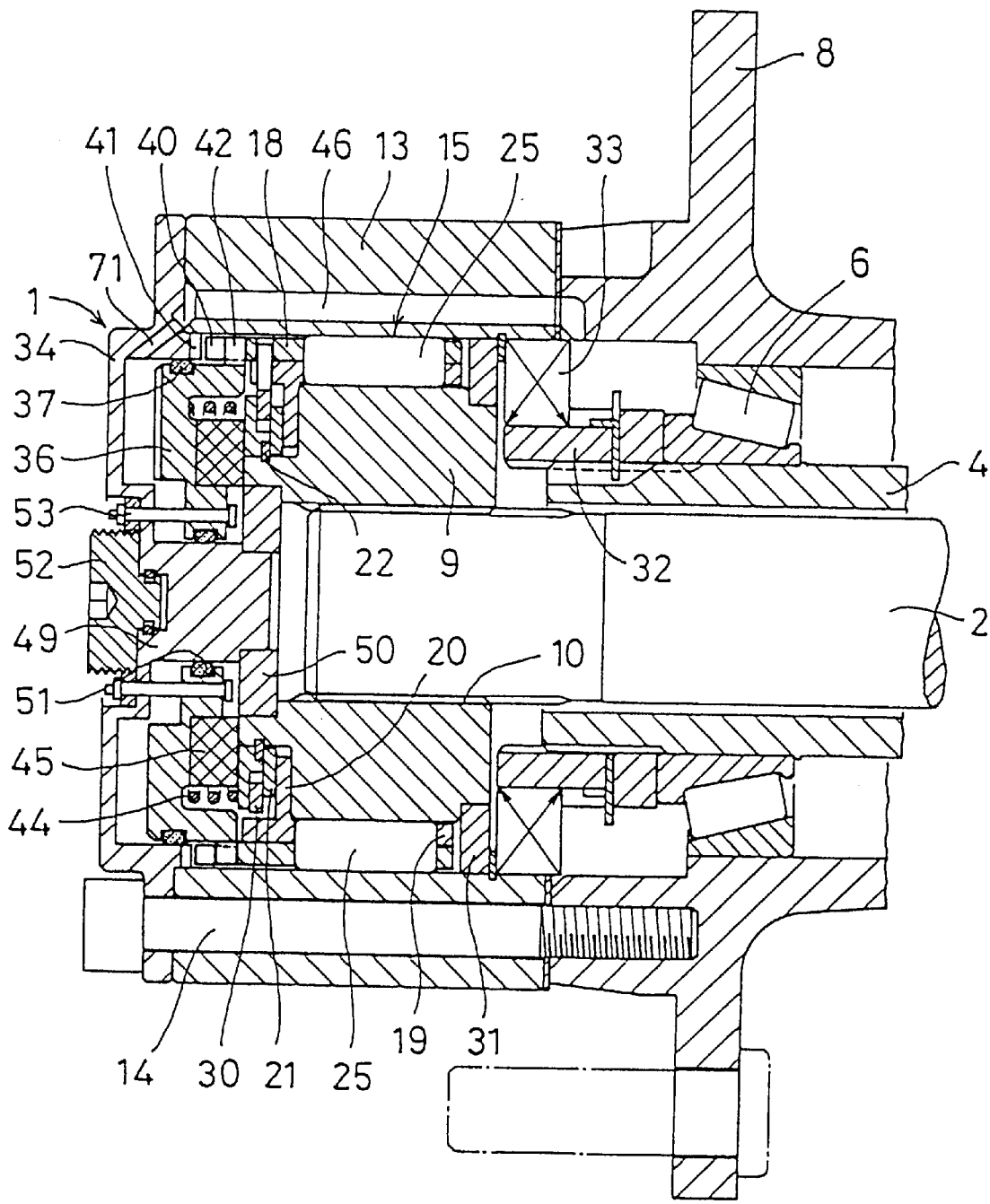
FIG. 2 is an enlarged vertical sectional view of a portion of the same in a two-wheel drive position.
Figure 3:
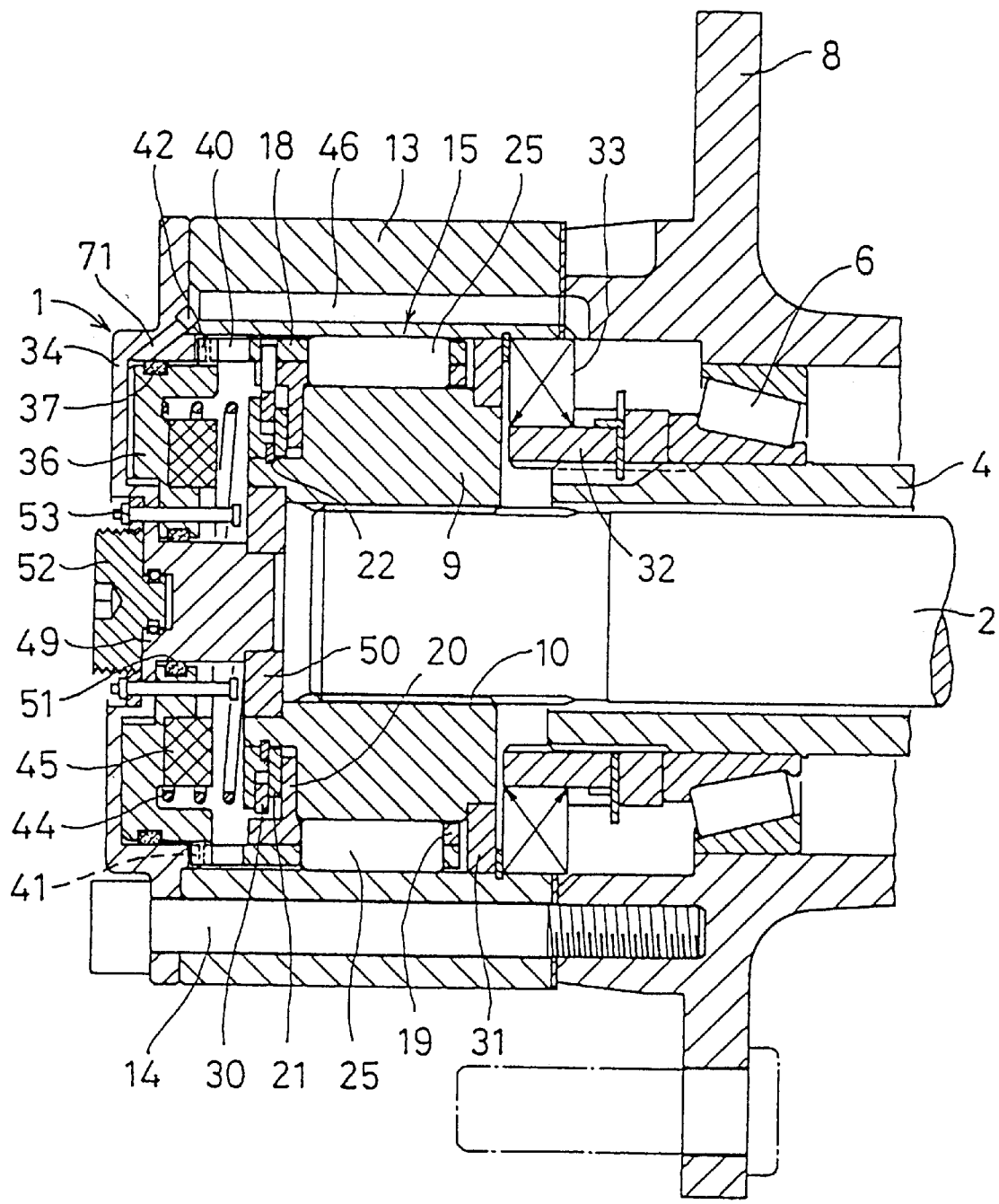
FIG. 3 is an enlarged vertical sectional view of a portion of the same in a four-wheel drive position.

As shown in FIGS. 2 and 3, an inner ring 9 as a driving member of the hub clutch assembly 1 is nonrotatably (with respect to axle 2) but axially slidably mounted on an end of the front wheel axle 2 by means of serrations 10. An outer ring 13 as a driven member is rotatably mounted around the inner ring 9. The outer ring 13 has its rear end fixed to an end face of the wheel hub 8 by a plurality of bolts 14. A two-way clutch 15 is mounted between the inner periphery of the outer ring 13 and the inner ring 9.

Figure 5:
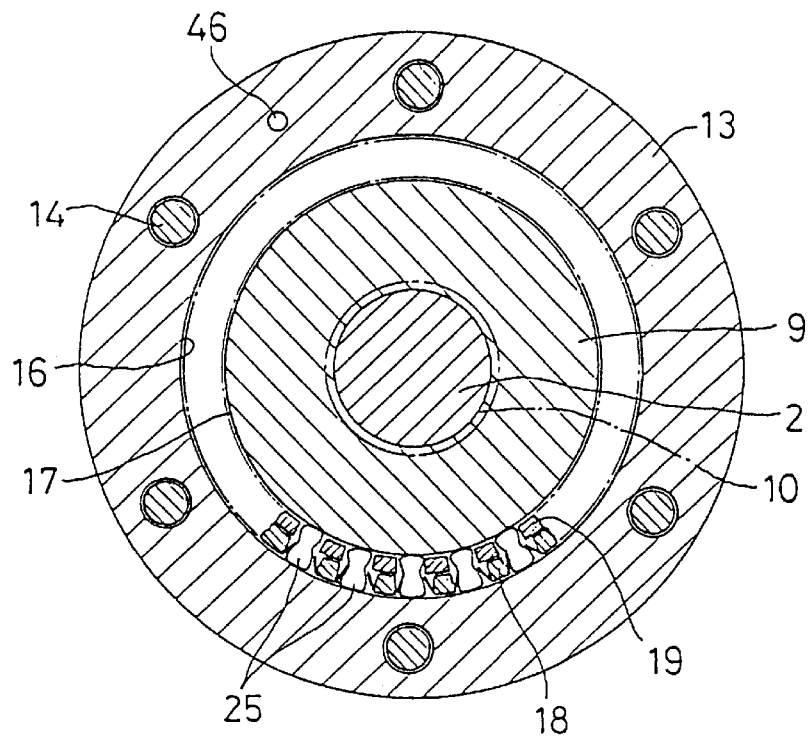
FIG. 5 is a sectional view of a portion of a two-way clutch showing its sprags.
Figure 6:
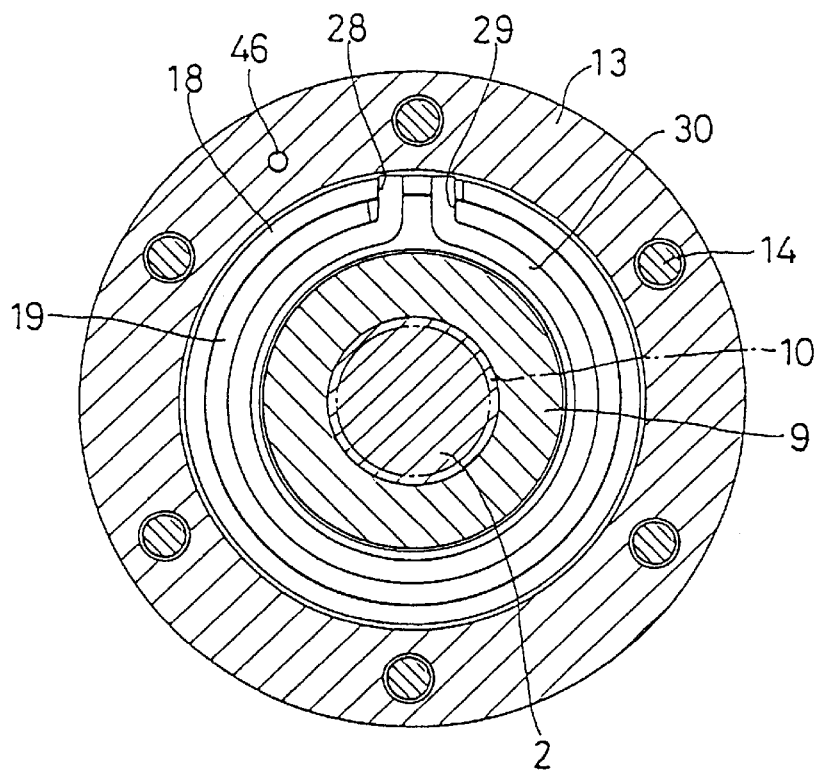
FIG. 6 is a sectional view of a portion of the two-way clutch showing its switch spring.
Figure 7:
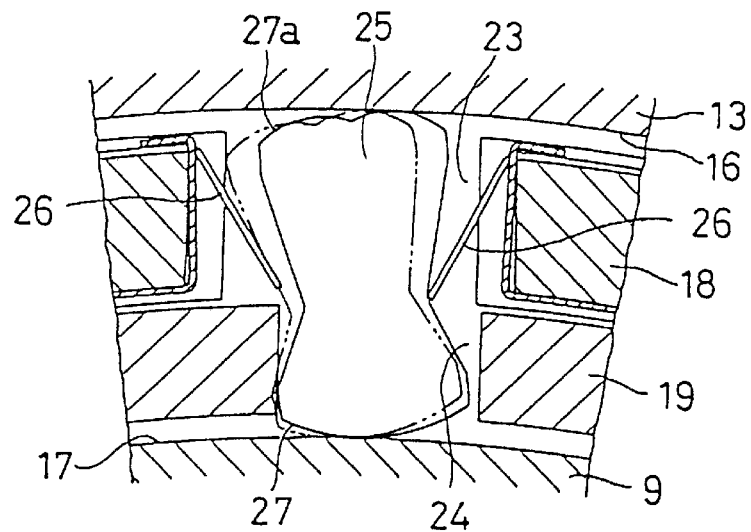
FIG. 7 is an enlarged sectional view of the two-way clutch showing its sprags.

As shown in FIGS. 5 to 7, the two-way clutch 15 includes a large-diameter retainer 18 and a small-diameter retainer 19 mounted between concentric cylindrical surfaces 16 and 17 formed on the inner periphery of the outer ring 13 and the outer periphery of the inner ring 9, respectively.

Referring to FIG. 2 and 3, the large-diameter retainer 18 is mounted rotatably relative to the outer ring 13 and the inner ring 9. The small-diameter retainer 19 has an inwardly bent portion 20 near its front end for slide contact with the end face of the inner ring 9. A press spring 21 in the form of a disk spring biases the bent portion 20 against: the end of the inner ring 9 to frictionally bind the small-diameter retainer 19 to the inner ring 9. The press spring 21 is retained in position by a retaining ring 22.

As shown in FIG. 7, a plurality of radially opposed pockets 23 and 24 are formed in the circumferential walls of the large-diameter retainer 18 and the small-diameter retainer 19, respectively. A sprag 25 as an engaging element and springs 26 for retaining the sprag are mounted in each pair of radially opposed pockets 23, 24.

Each sprag 25 has inner and outer symmetrical arcuate surfaces 27 and 27a having centers of curvature at different points. When the sprags are inclined by a predetermined angle in either direction, they engage the cylindrical surfaces 16 and 17, locking the outer ring 13 and the inner ring 9 together. The springs 26, each supported at one end on the large-diameter retainer 18, press each sprag 25 from both sides to keep them in engagement with the cylindrical surfaces 16 and 17.

Radially aligned slits 28 and 29 are formed in the peripheral walls of the large-diameter retainer 18 and the small-diameter retainer 19, respectively (FIG. 6). A C-shaped switch spring 30 is set in a circumferentially compressed state with both of its ends engaged in the slits 28 and 29 to urge the large-diameter retainer 18 and the small-diameter retainer 19 in the opposite directions with its ends pressed against the respective retainers 18 and 19.

Biased by the switch spring 30, the retainers 18, 19 are turned relative to each other so that the sprags 25 are inclined in one direction to a standby position where they are ready to lock the inner and outer rings together. Thus, the switch spring 30 serves as a torque generator that biases the large-diameter retainer 18 so as to turn in one direction relative to the small-diameter retainer 19.

A support metal 31 (FIG. 1) is disposed between the rear ends of the outer ring 13 and the inner ring 9 of the two-way clutch 15. A spacer 32 is fitted on the spindle 4 between the rear end of the inner ring 9 of the two-way clutch 15 and the tapered bearing 6. An oil seal 33 is provided between the spacer 32 and the inner periphery of the outer ring 13 near its rear end.

A lid 34 is fixed to the front end of the outer ring 13 to close its opening at the front end. The lid 34 is a cylindrical member that fits tightly in the outer ring 13 and has a cylinder chamber 35 having its outer end closed (FIG. 4C). An annular slider 36 is mounted in the cylinder chamber 35 and is provided with a seal ring 37 on its outer periphery so as to be axially slidable in the cylinder chamber 35. Outer and inner chambers 38 and 39 are defined on opposite sides of the slider 36.

Figure 4A:
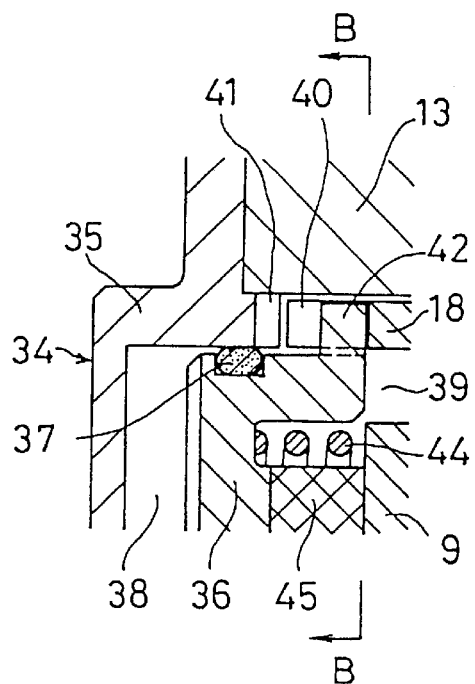
FIG. 4A is an enlarged sectional view of a drive position changeover mechanism in a two-wheel drive position.
Figure 4B:
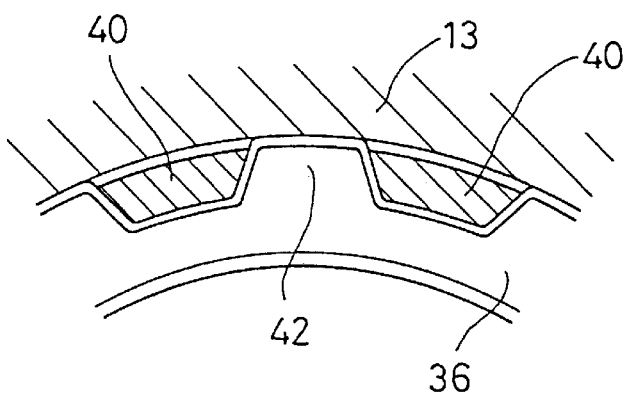
FIG. 4B is a sectional view taken along arrow B—B of FIG. 4A.
Figure 4C:
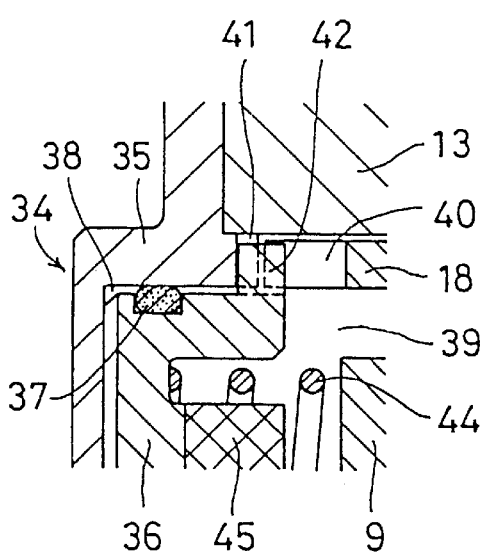
FIG. 4C is an enlarged sectional view of the drive position changeover mechanism in a four-wheel drive position.

As shown in FIGS. 4A–4C, the large-diameter retainer 18 has gear teeth 40 near its front end which are arranged circumferentially at equal intervals. Gear teeth 41 which are the same in number and shape as the gear teeth 40 are formed on the lid 34 near its rear end. Further, gear teeth 42 are formed on the outer periphery of the slider 36 near its rear end. They are adapted to mesh with both gear teeth 40 and 41 and are slidable relative to the teeth 41 of the lid 34.

Thus, when the slider 36 moves forward, the gear teeth 42 of the slider 36 will mesh with both the gear teeth 40 of the large-diameter retainer 18 and the gear teeth 41 of the lid 34, coupling the large-diameter retainer 18 with the lid 34 (and thus the outer ring 13). When the slider 36 moves backward, the large-diameter retainer 18 can be uncoupled from the lid 34.

A spring 44 is mounted in a compressed state between the slider 36 and a ring-shaped washer 43 (FIG. 1) provided at the front end of the two-way clutch 15 to bias the slider 36 at all times toward a position where the large-diameter retainer 18 is uncoupled from the lid 34. A magnet 45 is fixed to the rear end of the slider 36 at a position opposite to the front end of the inner ring 9.

When the slider 36 is moved backward until its gear teeth 42 get out of mesh with the gear teeth 40, 41 of the large-diameter retainer 18 and the lid 34, the magnet 45 attracts the inner ring 9 overcoming the force of the spring 44 to keep the gear teeth 42 out of mesh with the gear teeth 40 and 41. For this purpose, the magnet 45 is set to have a larger magnetic force than the spring force of the compressed spring 44.

Figure 8:
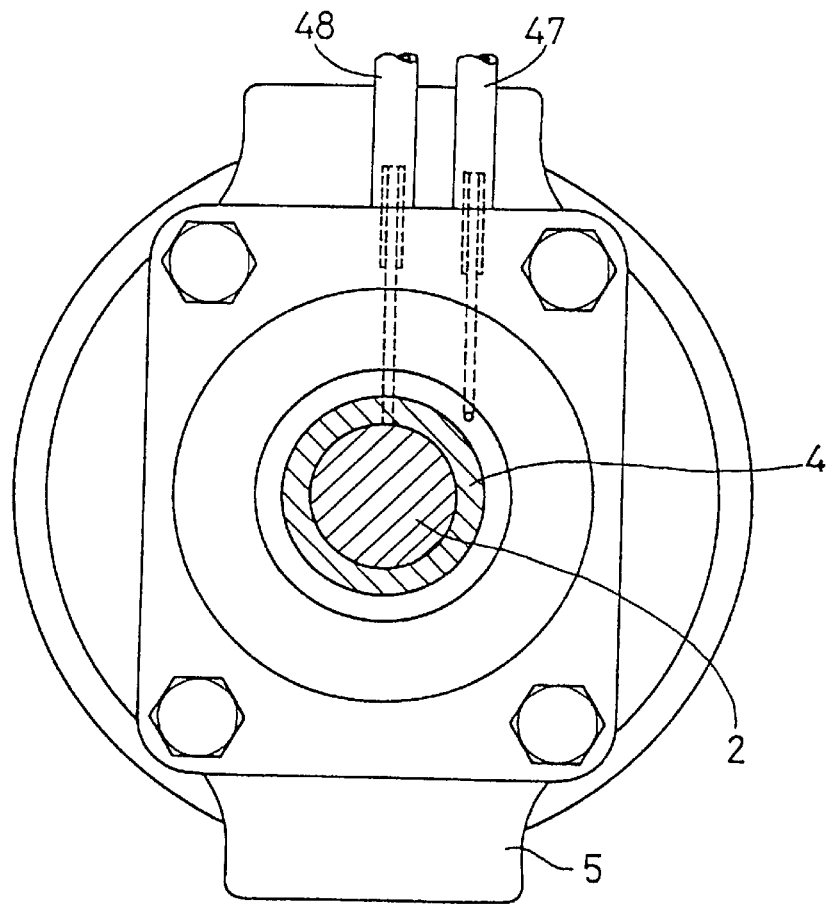
FIG. 8 is a vertical sectional view taken along arrow VIII—VIII of FIG. 1.

A means is provided to move the slider 36 to change over the drive mode between the four-wheel drive position and two-wheel drive position. This means includes an air passage 46 extending axially through the outer ring 13. It communicates at one end with the outer chamber 38 through a cutout 71 (FIG. 2) formed in the lid 34. At its other end, as shown in FIGS. 1 and 8, the air passage 46 communicates with an air source (not shown) through the space between the spindle 4 and the wheel hub 8, the interior of the tapered bearings 6 and 7 mounted in this space, and an air pipe 47. By remote controlling e.g. from the transfer of the four-wheel drive vehicle, a negative pressure or a positive pressure is supplied from the air source.

The inner chamber 39 communicates with the air source through air passages, i.e. a space in the two-way clutch 15 and a gap between the front wheel axle 2 and the spindle 4, and an air pipe 48 connected to the rear end of the spindle 4.

A cylindrical shaft 49 protrudes from the center of the inner surface of the lid 34 to support the front end of the inner ring 9 from inside through a metal 50 (FIG. 3). The slider 36 fits on the cylindrical shaft 49 through a seal ring 51 provided on its inner periphery for sliding contact with the cylindrical shaft 49.

A fail-safe button screw 52 is rotatably provided in the outer surface of the lid 34 at its center. Pins 53 axially movably and airtightly extend through the lid 34 and the slider 36 at a plurality of points around the cylindrical shaft 49. The pins 53 engage the slider 36 at their rear ends to restrict its backward movement. The pins 53 have threaded heads meshing with feed threads formed on the outer periphery of the button switch 52. By turning the switch 52, the pins 53 are moved axially.

When the pins 53 are in their retracted position, they will not interfere with the movement of the slider 36. If air should leak through e.g. the air passage while the driving mode is in the two-wheel drive position, in which the magnet 45 of the slider 36 is attracted to the inner ring 9, the driver turns the button switch 52 to move the pins 53. Since the slider 36 is pulled forward by the pins 53, the magnet 45 will be forcibly separated from the inner ring 9. Once the magnet 45 separates from the inner ring 9, the slider 36 is pushed forward by the spring 44 until the gear teeth 42 mesh with the gear teeth 40 and 41 of the lid 34 and the large-diameter retainer 18, respectively. Thus, it is possible to change over the driving mode to the four-wheel position even if the remote-controlled changeover means should fail.

We will now explain the operation of the hub clutch assembly of the first embodiment as mounted on a vehicle.

In the two-wheel drive position shown in FIGS. 2 and 4A, the magnet 45 is attracted to the inner ring 9, so that the slider 36 is kept in the retracted position, compressing the spring 44. In this state, the gear teeth 42 are out of mesh with the gear teeth 41 of the lid 34.

When the vehicle begins to move forward, the sprags 25 of the two-way clutch 15 are tipped in one direction to the position where they are ready to come into wedging engagement.

While the outer ring 13 is rotating faster than the axle with the sprags-25 in the above position, the sprags 25 will not come into wedging engagement, allowing the outer ring 13 to freewheel. In this state, the front wheel axle 2 is disconnected from the transfer. Thus, neither the driving force from the engine nor the rotation of the front wheels is transmitted to the axle 2. This means that the drive train from the transfer to the front wheel axle stops during the two-wheel drive mode.

In order to travel on a road with a low friction coefficient such as a snow-covered road in the four-wheel drive position, air in the sealed chamber 38 is sucked through the pipe 47 (FIG. 3) to create a negative pressure in the chamber 38. The negative pressure pulls the slider 36 to separate the magnet 45 from the inner ring against the attraction force of the magnet. Once the magnet separates from the inner ring, the slider 36 is pushed outward by the spring until its gear teeth 42 mesh with the gear teeth 40 and 41 of the lid 34 and the large-diameter retainer 18. The pressure in the chamber 38 is kept at a negative pressure only while the driving mode is being changed over to the four-wheel position. Once this is done, the pressure in the chamber 38 returns to the atmospheric pressure.

In this state, the outer ring 13 and the large-diameter retainer 18 are locked together, so that the latter rotates in the same direction as the former. When the large-diameter retainer 18 begins rotating, the sprags 25, which are freewheeling as shown in FIG. 7, will incline in the opposite direction, coming into wedging engagement with the cylindrical surfaces 16, 17 of the inner and outer rings 9 and 13. The outer ring 13 is now locked to the front wheel axle 2 through the inner ring 9, so that the vehicle is driven in the four-wheel drive mode with the front and rear wheels locked together. Now the engine brake can be applied to both the front and rear brakes.

In order to travel on a road with a high friction coefficient such as a paved road in the four-wheel drive position, air in the chamber 39 is sucked to move the slider 36 rearwardly until the magnet 45 is stuck on the inner ring 9 as shown in FIG. 2. In this state, the gear teeth 42 are separate from the gear teeth 41 of the lid 34, so that the outer ring 13 is separated from the large-diameter retainer 18.

The vehicle is now driven in the "flexible" four-wheel drive position in which the drive mode automatically changes over according to the rotational speed difference between the driving side and the driven side.

Specifically, while the vehicle is turning a corner, the outer ring 13 coupled to the front wheel is rotating faster than the inner ring 9 due to the difference in turning radius between the front wheels and the rear ones, so that the outer ring 13 free-runs relative to the sprags 25. In this state, the front wheels and the rear wheels are rotating separately from each other, so that the vehicle can smoothly turn even a tight corner with no braking effects.

If one of the rear wheels slips while the vehicle is traveling forward with only the rear wheels driven, the front wheel axle 2 will begin to rotate faster than the front wheels because the rotating speed of the latter is dropping with the dropping vehicle speed. The sprags 25 will thus engage the inner and outer rings 9 and 13, locking them together. The driving mode thus automatically changes to the four-wheel drive position.

The hub clutch assembly of the first embodiment can cope with continuously changing various road conditions. A vehicle equipped with such a hub clutch assembly can be driven as stably and smoothly as a conventional full-time four-wheel drive vehicle.

A negative or positive pressure is used only to move the slider 36 between two predetermined positions. It is not necessary to hold a negative pressure or a positive pressure to keep the slider in either of these two positions. A negative or positive pressure is created by sucking or charging air by controlling a switch. Such an air supply control mechanism is simple in structure. Since a negative pressure or a positive pressure is created only for a very short period of time, it is possible to restrain wear of the sealing portions of the hub and spindle.

Air is introduced into and sucked out of the sealed chambers 38 and 39 through air passages extending through the outer ring 13. It is not necessary to form any complicated passage means by machining the knuckle or the homokinetic joint.

(Second Embodiment)

Figure 9:
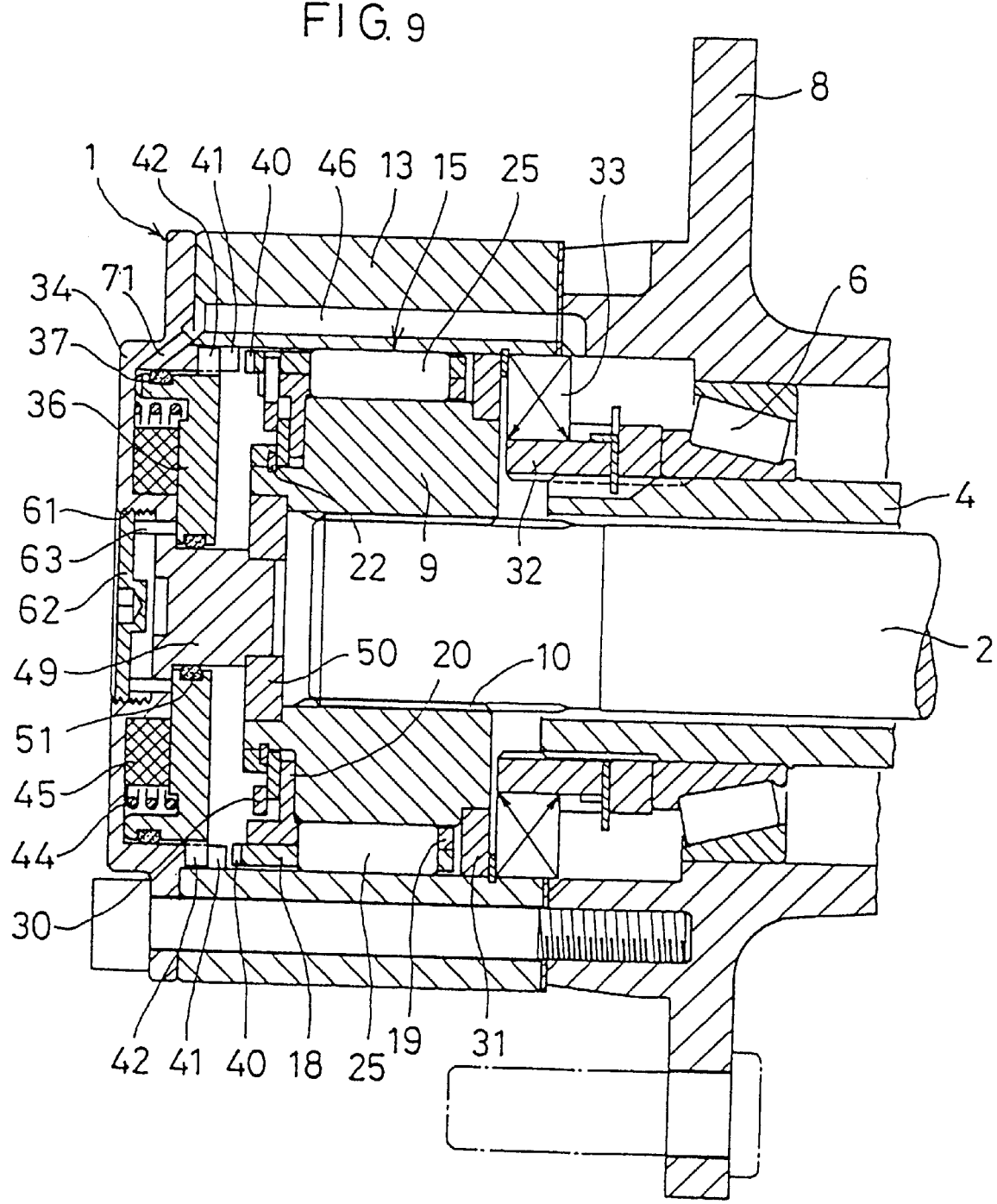
FIG. 9 is a vertical sectional view of a second embodiment of the hub clutch assembly in a two-wheel drive position.
Figure 10:
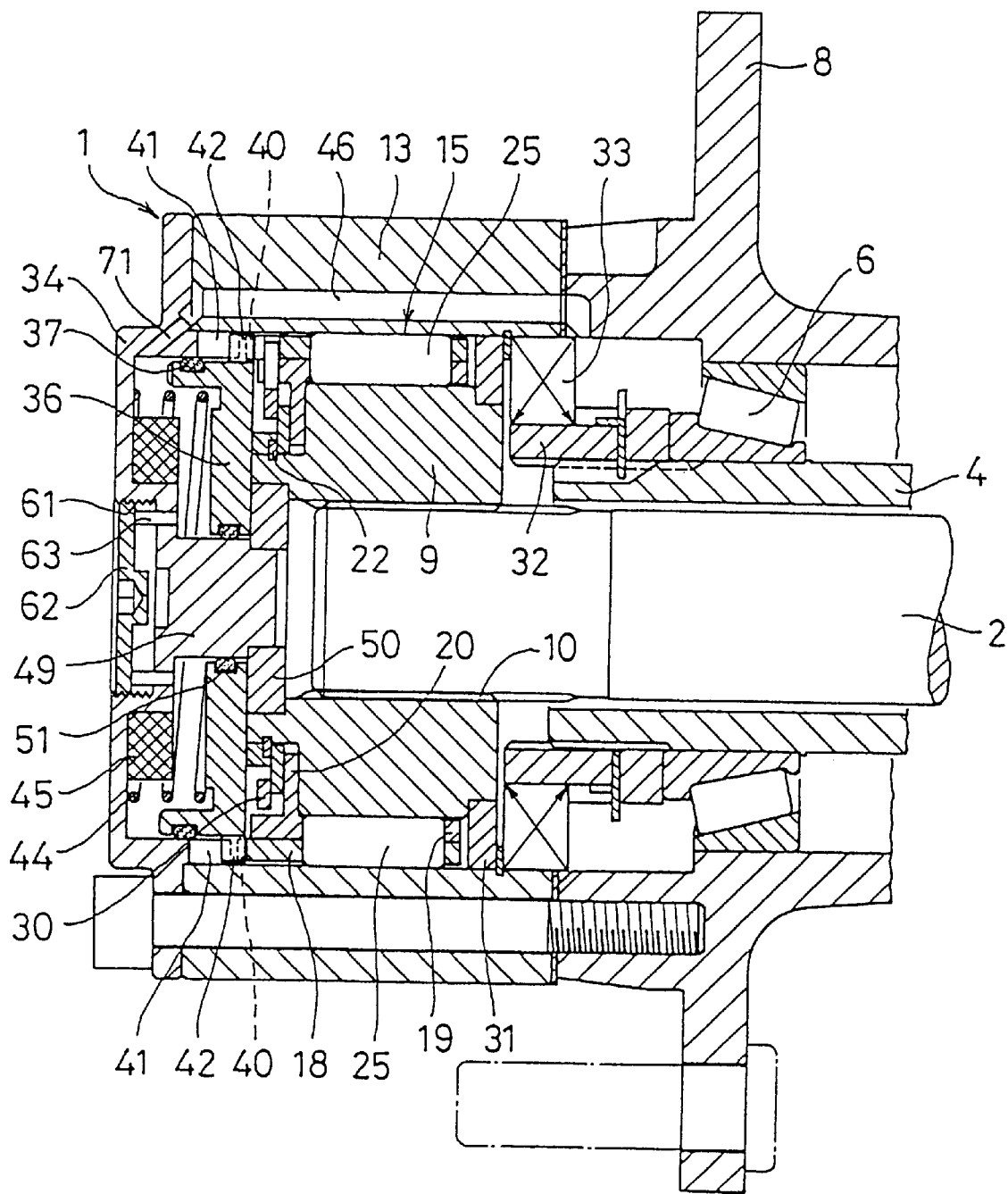
FIG. 10 is a vertical sectional view of the same in a four-wheel drive position.

FIGS. 9 and 10 show the second embodiment, which differs from the first embodiment only in that the slider is positioned and controlled in the opposite way. The same elements as the first embodiment are denoted by the same numerals and their description is omitted.

In the second embodiment, the spring 44 is mounted in a compressed state between the slider 36 and the lid 34 to bias the slider 36 toward the inner ring 9. The magnet 45 is fixed to the inner surface of the lid 34 to attract the slider 36 to the lid 34.

When the slider 36 is in the retracted position, the gear teeth 42 formed on the slider 36 are in mesh with both the gear teeth 41 formed on the lid 34 and the gear teeth 42 of the large-diameter retainer 18, thus coupling the lid 34 and the large-diameter retainer 18 together. When the slider 36 is in the forward position, the gear teeth 42 are out of mesh with the gear teeth 40 of the large-diameter retainer 18.

The fail-safe mechanism of the second embodiment includes a threaded plate 62 threadedly engaged in a threaded hole 61 formed in the outer surface of the lid 34 at its center. By turning the threaded plate 62, a plurality of pins 63 airtightly extending through the lid 34 can be axially moved. By moving the pins 63 axially rearwardly, the slider 36 is pushed by the pins 63 and separated from the magnet 45.

When the slider 36 is in the forward position as shown in FIG. 9, the lid 34 and the large-diameter retainer 18 are not locked together, so that the vehicle is driven in the two-wheel drive mode. When the slider 36 is in the retracted position, the lid 34 and the large-diameter retainer 18 are locked together. The vehicle is thus driven in the four-wheel drive mode. The driving mode is changed over between the four-wheel and two-wheel drive positions by selectively creating a negative pressure or a positive pressure in the chambers 38, 39 on both sides of the slider 36 in the same manner as in the first embodiment.

(Third Embodiment)

Figure 11:
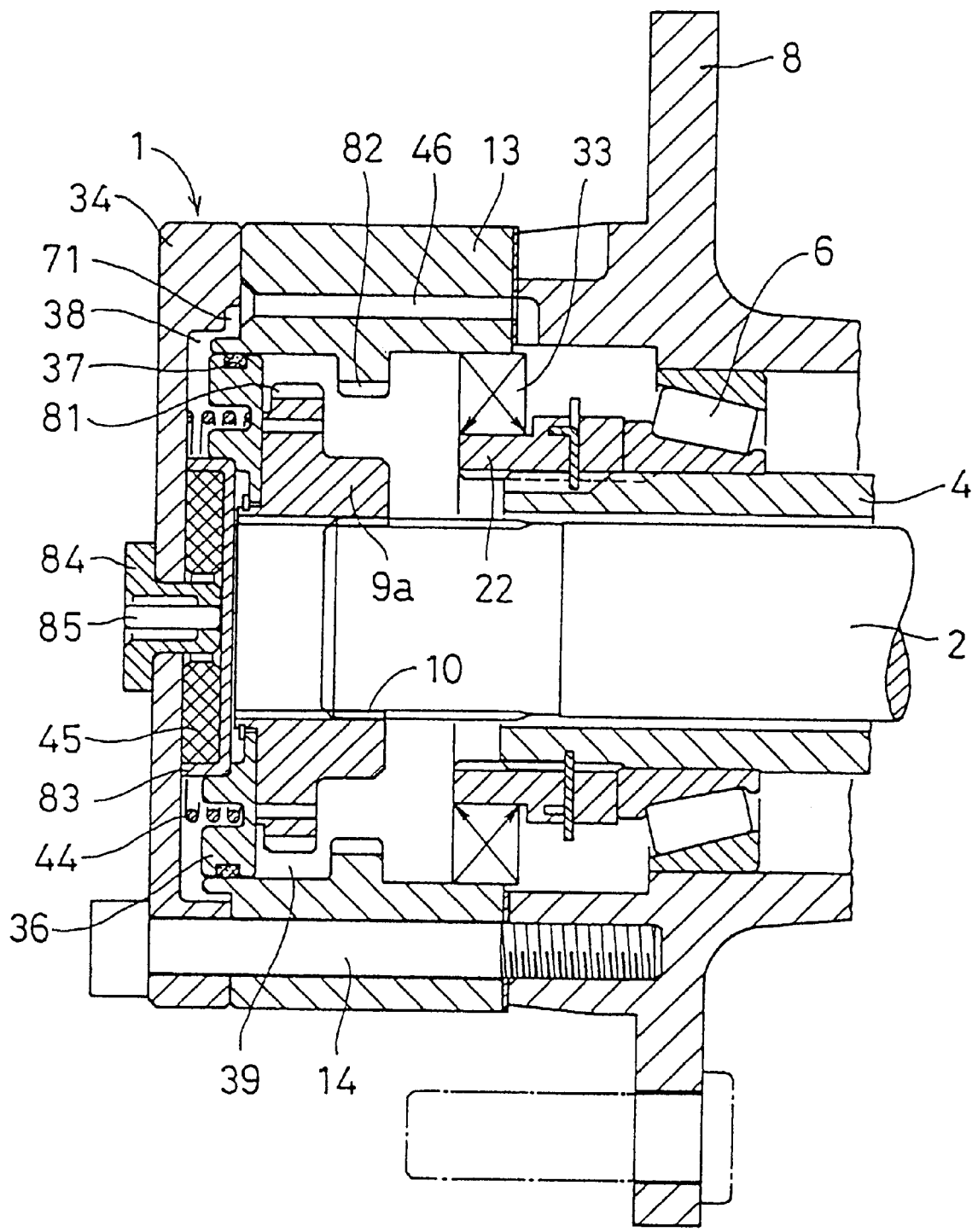
FIG. 11 is a vertical sectional view of a third embodiment of the hub clutch assembly two-wheel drive position.
Figure 12:
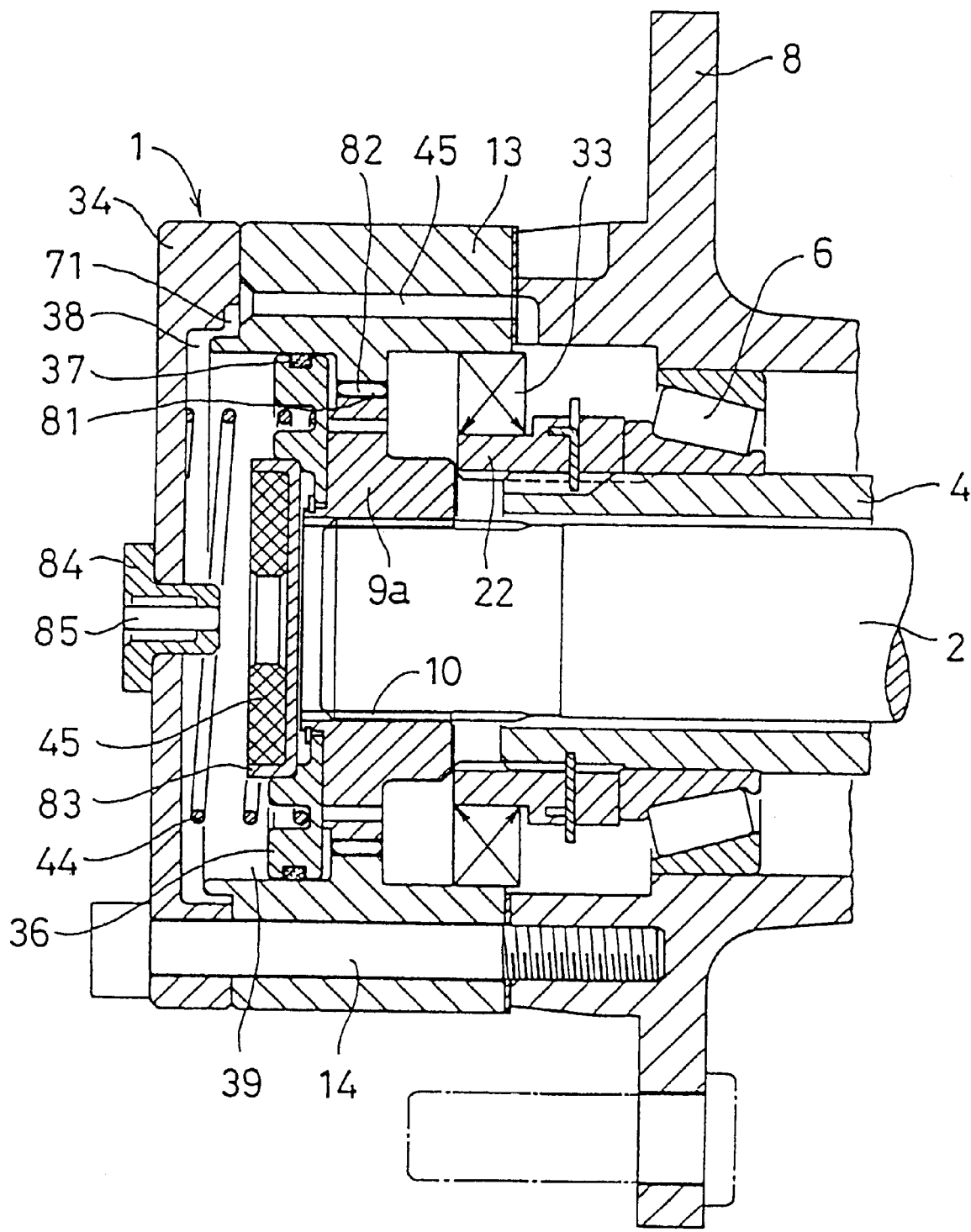
FIG. 12 is a vertical sectional view of the same in a four-wheel drive position.

FIG. 11 and 12 show the third embodiment, in which a gear is used in place of the two-way clutch of the first embodiment so that the front wheel axle can be directly coupled to the outer ring. The same elements as the first embodiment are denoted by the same numerals and their description is omitted.

In the third embodiment, an inner ring 9a as a driving member is nonrotatably but axially movably mounted on each end of the front wheel axle 2 through serrations 10. The inner ring 9a has an external gear 81 on its outer periphery. An outer ring 13 is rotatably mounted around the inner ring 9a. The outer ring 13 has an internal gear 82. By axially sliding the inner ring 9a, its external gear 81 is adapted to move into mesh with and out of mesh with the internal gear 82.

A slider 36 is axially slidably received in the outer ring 13 near its front end and is fixed to the inner ring 9a so as to be axially moved together with the inner ring 9a. A spring 44 is mounted in a compressed state between the slider 36 and the lid 34 to bias the inner ring 9a toward a retracted position at all times.

A magnet 45 is fixed through a case 83 to the outer side of the slider 36 at its center. When the inner ring 9a is in the forward position, the magnet 45 is adapted to stick to the lid 34, keeping the external gear 81 separated from the internal gear 82.

The fail-safe mechanism of the third embodiment includes a pin case 84 fixed to the center of the lid 34, and a pin 85 axially movably supported in the pin case 84. By pushing in the pin 85, the magnet 45 separates from the lid 34, so that the slider 36 and the inner ring 9a are pushed by the spring 44 until the external gear 81 meshes with the internal gear 82.

In operation, during the four-wheel drive mode, the slider 36 and the inner ring 9a are pushed rearwardly to keep the external gear 81 in mesh with the internal gear 82 as shown in FIG. 12.

In this state, the front wheel axle 2 and the outer ring 13 are locked together, so that not only the driving force but also the braking force are transmitted from the engine to all four wheels.

To change over the driving mode from four-wheel to two-wheel drive position, air in the sealed chamber 38 is drawn out to exert a negative pressure on the slider 36. The slider 36 and the inner ring 9a are thus pulled outwardly until the magnet 45 sticks to the lid 34 and the external gear 81 separates from the internal gear 82.

The driving mode can be changed over between the four-wheel drive position and the two-wheel drive position by creating a negative pressure or a positive pressure in one of the chambers 38 and 39 on both sides of the slider 36. The two-wheel drive position is maintained by keeping the magnet 45 stuck magnetically on the lid 34. The four-wheel drive position is maintained by the biasing force of the spring 44.

Thus, once the driving position is changed over, it is no longer necessary to maintain a negative pressure or a positive pressure. Thus, as soon as the driving position is changed over, the pressure in the air passage can be brought back to the atmospheric pressure. Since a negative pressure or a positive pressure acts on the seal portions of the hub and the spindle only for a very short time, their durability is kept high.

(Fourth Embodiment)

Figure 13:
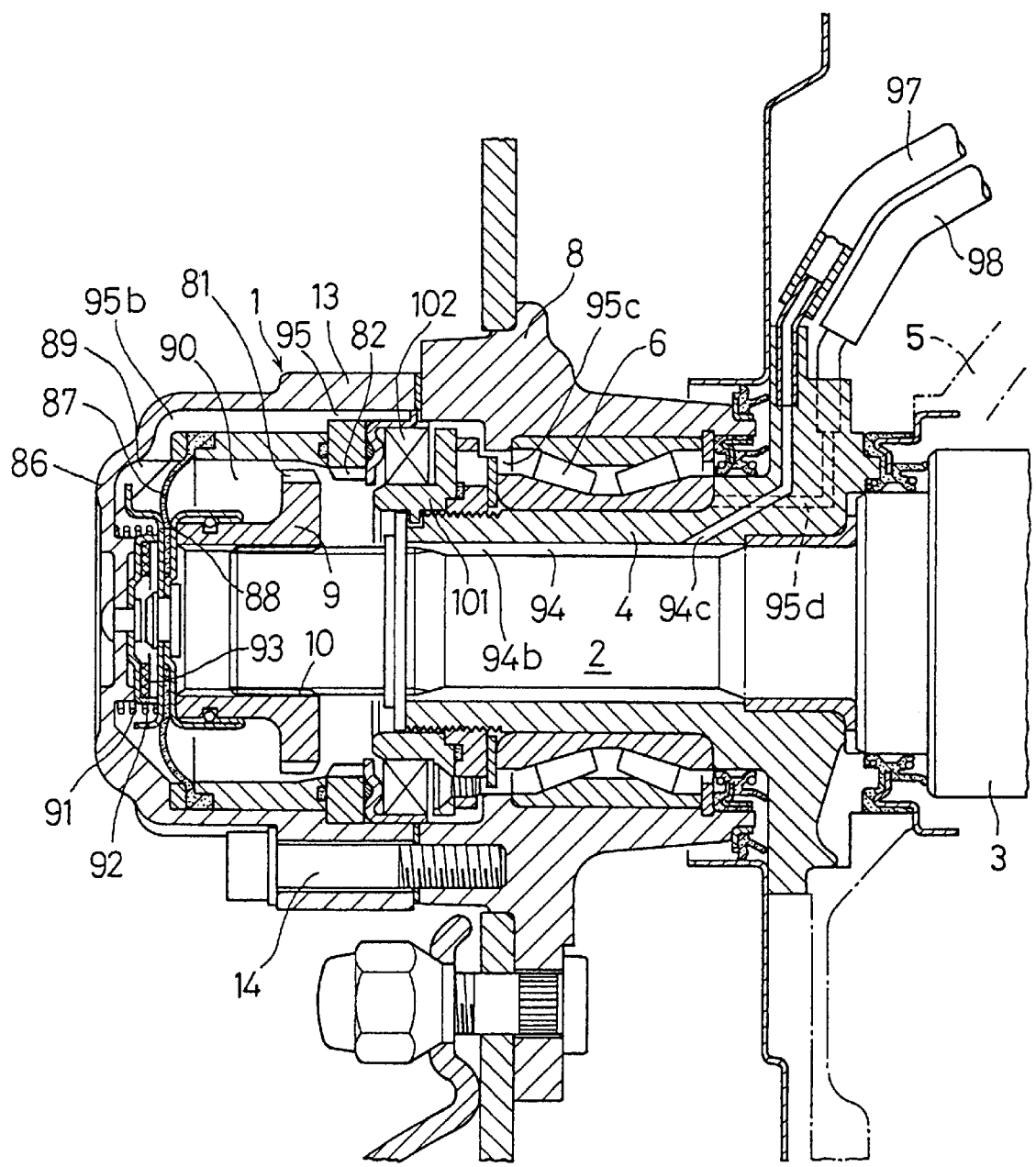
FIG. 13 is a vertical sectional view of a portion of a fourth embodiment, showing its state in a two-wheel drive mode.
Figure 14:
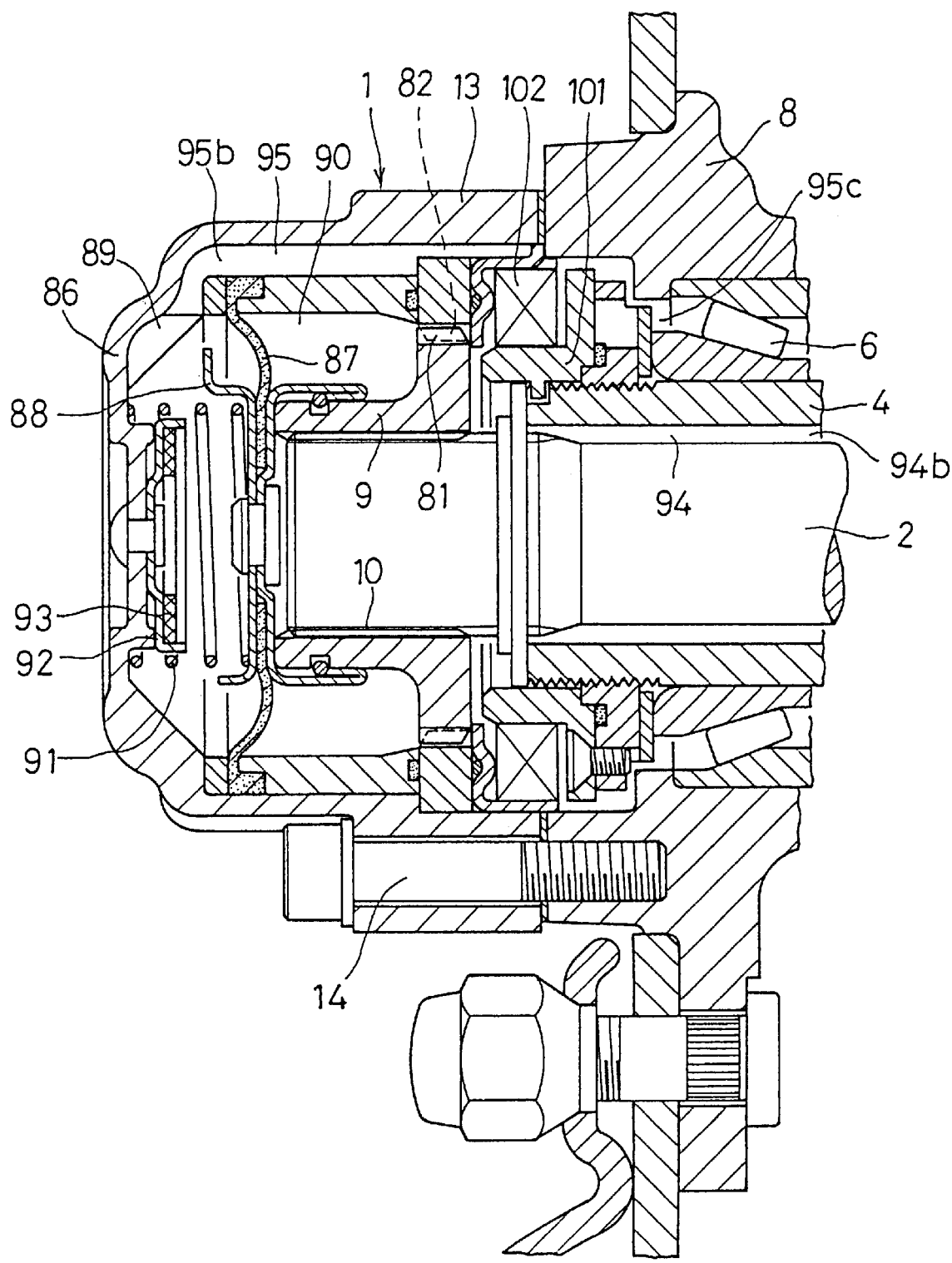
FIG. 14 is a partial enlarged view of FIG. 13 showing its state in a four-wheel drive mode.

FIGS. 13 and 14 show the fourth embodiment, in which, like the third embodiment, gears are used in place of the two-way clutch of the first embodiment so that the front wheel axle can be directly coupled to the outer ring. The same elements as the first embodiment are denoted by the same numerals and their description is omitted.

In this embodiment, an inner ring 9 as a driving member is nonrotatably but axially slidably mounted on one end of the front wheel axle 2 through serrations 10. The inner ring 9 has an external gear 81 on its outer periphery. An outer ring 13 as a driven member is rotatably mounted around the inner ring 9. The outer ring 13 is fixed by bolts at its rear end to an end of the wheel hub 8 and has an internal gear 82. By axially sliding the inner ring 9a, its external gear 81 is adapted to move into and out of mesh with the internal gear 82.

The outer ring 13 has an integral lid portion 86 hermetically sealing the front end of the outer ring 13. A diaphragm 87 is provided in the outer ring 13 with its outer edge airtightly fastened to the inner periphery of the outer ring 13 and its inner edge airtightly coupled to the inner ring 9 so as to be axially movable together with the inner ring 9. The diaphragm 87 divides the interior of the outer ring 13 into outer and inner airtight chambers 89 and 90.

A spring 91 is mounted in a compressed state between the diaphragm 87 and the lid portion 86 to bias the inner ring 9 away from the lid portion. A magnet 93 is fixed through a case 92 to the inner surface of the lid portion 86 at its center. When the inner ring 9 is in the forward position, the magnet 93 is adapted to attract fixing washer 88 of the diaphragm 87, keeping the external gear 81 separated from the internal gear 82.

The hub clutch assembly 1 has two air passages 94 and 95 communicating with the airtight chambers 89 and 90, respectively, to move the inner ring 9 between the four-wheel drive position and the two-wheel drive position.

The first air passage 95, which communicates with the outer airtight chamber 89, comprises a passage 95b formed in the outer ring 13 and communicating with the airtight chamber 89, a gap 95c between the spindle 4 and the wheel hub 8, and a passage 95d formed in the rear end of the spindle 4 and communicating at one end thereof with the gap 95c and a gap in bearings 6 mounted in the gap 95c and at the other end with an air pipe 98 connected to an air source.

The second air passage 94, which communicates with the inner airtight chamber 90, comprises a gap 94b between the front wheel axle 2 and the spindle 4, and a passage 94c formed in the rear end of the spindle 4 and communicating at one end thereof with the gap 94b and at the other end with an air pipe 97 connected to the air source.

The airtight chambers 89 and 90 are kept airtight by a nut 101 threaded on the tip of the spindle 4 and an oil seal 102 mounted between the nut 101 and the inner periphery of the outer ring 13. Since the second passage 95 is provided between the spindle 4 and the wheel hub 8, while the first passage 94 is formed between the front wheel axle 2 and the spindle 4, they take up practically no extra space in the wheel hub 8, so that the provision of these passages will scarcely increase the diameter of the entire hub clutch assembly.

In operation, during the four-wheel drive mode, the inner ring 9 is pushed rearwardly to bring the external gear 81 into mesh with the internal gear 82 as shown in FIG. 14.

In this state, the front wheel axle 2 and the outer ring 13 are locked together, so that not only the driving force but also the braking force is transmitted from the engine to all four wheels.

To change over the driving mode from four-wheel to two-wheel drive position, air in the outer airtight chamber 89 is drawn out to exert a negative pressure on the diaphragm 87. The diaphragm 87 and the inner ring 9 are thus pulled outwardly against the force of the spring 91 until the magnet 93 sticks to the lid 86 and the external gear 81 separates from the internal gear 82.

The driving mode can be changed over between the four-wheel drive position and the two-wheel drive position by creating a negative pressure or a positive pressure in one of the chambers 89 and 90 on opposite sides of the diaphragm 87. The two-wheel drive position is maintained by keeping the magnet 93 stuck magnetically on the lid 96. The four-wheel drive position is maintained by the biasing force of the spring 91. The driving mode may be changed over between the two-wheel and four-wheel drive positions by a control means, which we will describe below in the description of the sixth embodiment.

(Fifth Embodiment)

Figure 15:
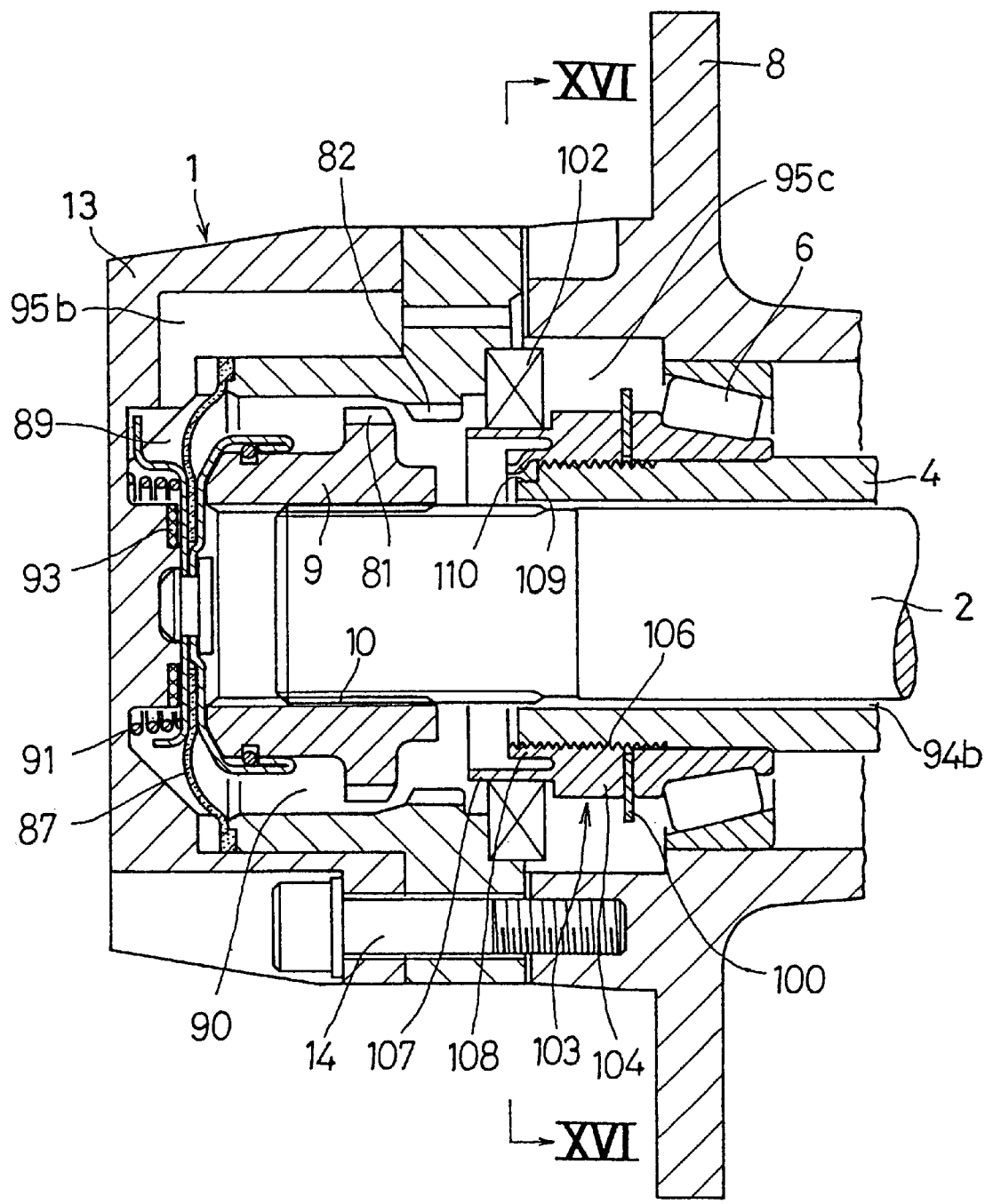
FIG. 15 is a partial enlarged view of a fifth embodiment.

FIG. 15 shows an air-actuated hub clutch assembly of the fifth embodiment. Basically, this embodiment is the same as the fourth embodiment except for the structure supporting the oil seal.

Figure 16:
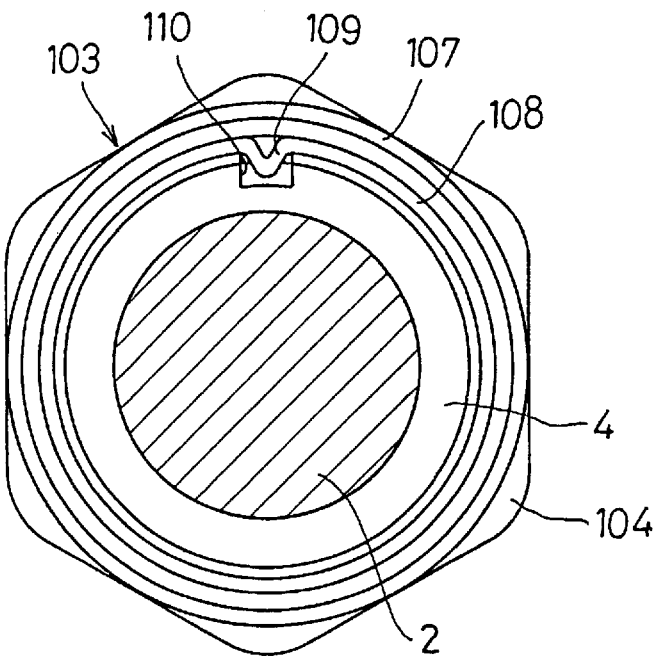
FIG. 16 is a front view of a nut of the fifth embodiment.
Figure 17:
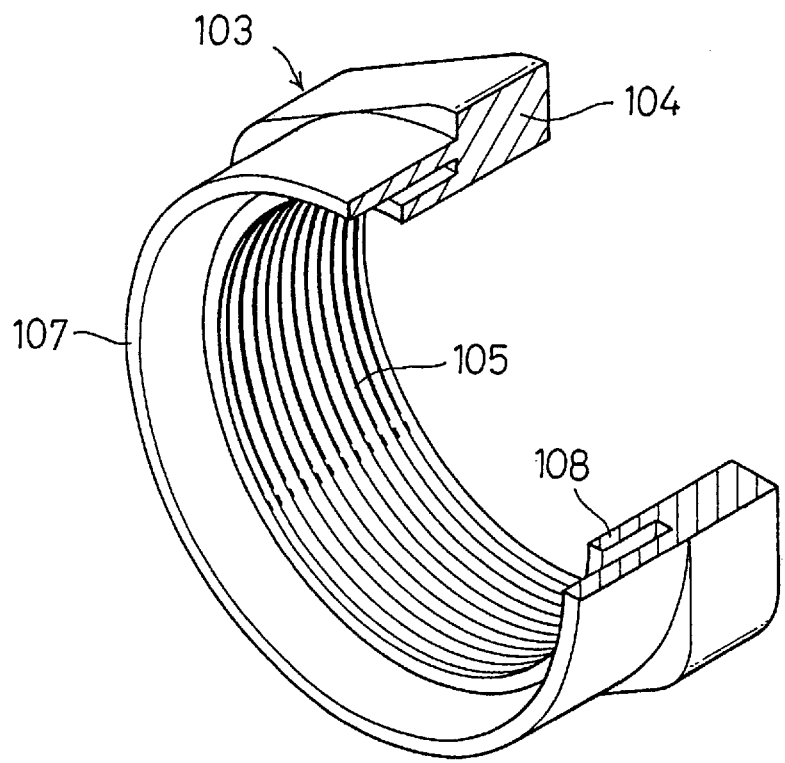
FIG. 17 is a perspective view of the nut of FIG. 16.

The nut 103 (shown in FIGS. 16 and 17) supporting the oil seal 102 is fixed to the end of the spindle 4 and includes a polygonal nut body 104 having female threads 105 formed on its inner periphery which are in mesh with male threads 106 formed on the spindle 4. Protruding from one end of the nut body 104 are an outer cylindrical support sheath 107 and an inner, shorter cylindrical portion 108 which are coaxial with and integral with the nut body 104. The oil seal 102 is supported on the support sheath 107. The cylindrical portion 108 is actually an extension of the inner-diameter portion of the nut body 104.

The nut 103 is threaded on the end of the spindle 3 and serves to fix a tapered bearing 6 in position through a washer 100. The oil seal 102 is held between the support sheath 107 of the nut 103 and the outer ring 13.

The cylindrical portion 108 of the nut 103 has its portion 109 bent and-engaged in a cutout 110 formed in the end of the spindle 4 to fix the nut 103 to the spindle 4.

With this arrangement, it is possible to airtightly seal an air chamber 89. That is, fluid communication between the air chamber 189 and another air chamber 90 is completely shut out. It is thus possible to smoothly and reliably change over the drive mode between the two-wheel and four-wheel drive positions by selectively supplying air into one of the chambers 89 and 90.

The single nut of this embodiment, having the integral support sheath for supporting the oil seal, can take the place of an oil seal supporting means as used in the previous embodiments, which comprises a plurality of separate parts. No O-ring is necessary. Thus, it is possible to reduce the number of parts of the hub clutch assembly. Such a hub clutch can be assembled easily at a low cost.

(Sixth Embodiment)

Figure 18:
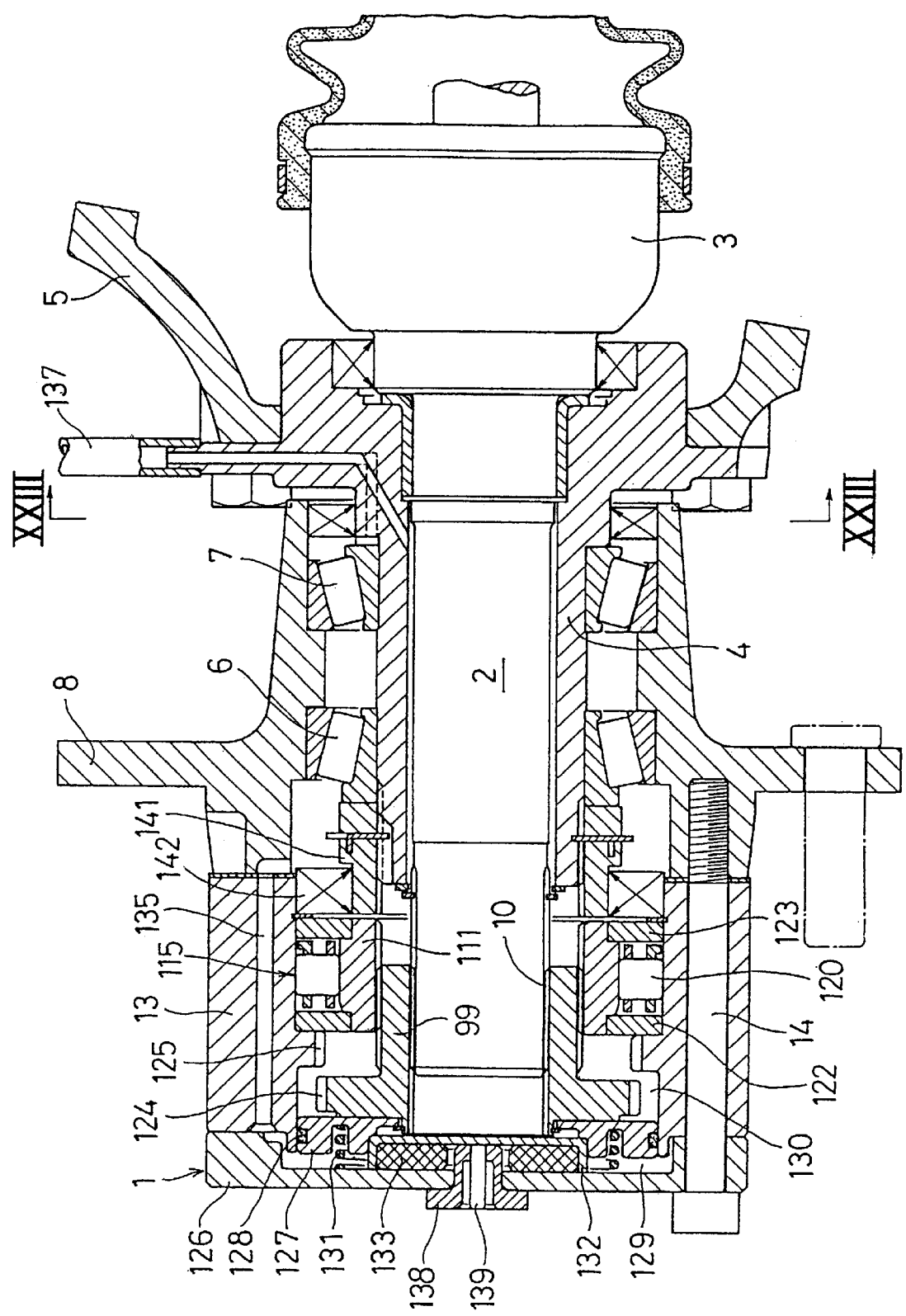
FIG. 18 is a vertical sectional view of a hub clutch assembly of a sixth embodiment mounted on a four-wheel drive vehicle.

FIGS. 18–25 show the fourth embodiment. In FIG. 18, numeral 1 designates a hub clutch assembly. Numeral 2 indicates a front wheel axle of a four-wheel drive vehicle. It is actually a shaft of a homokinetic joint 3 coupled to a drive train of the vehicle.

The front wheel axle 2 carries a spindle 4 fixed to a knuckle 5 of the vehicle to rotatably support a wheel hub 8 through tapered bearings 6 and 7.

Figure 19:
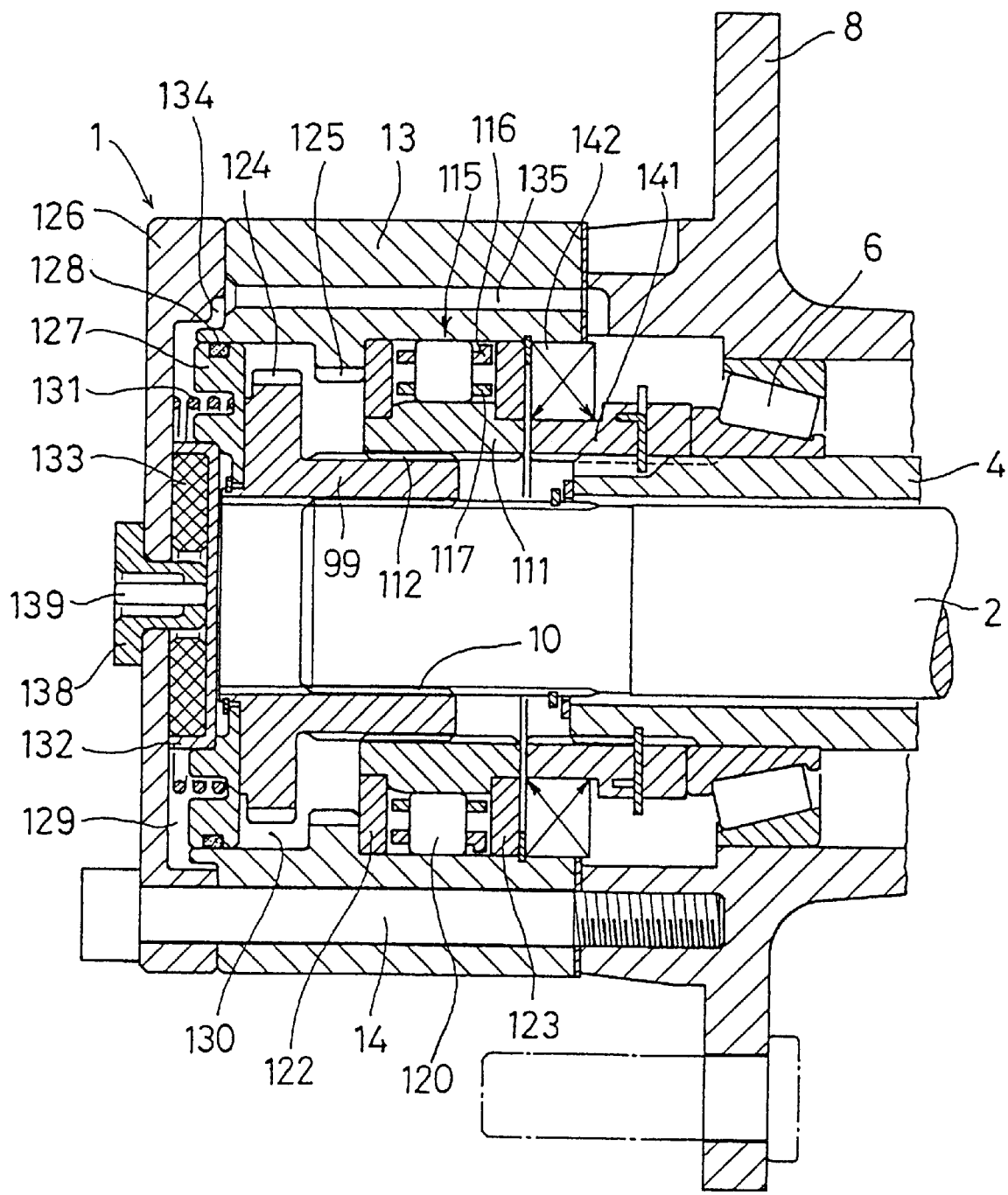
FIG. 19 is an enlarged vertical sectional view of a portion of the same in a two wheel drive position.
Figure 20:
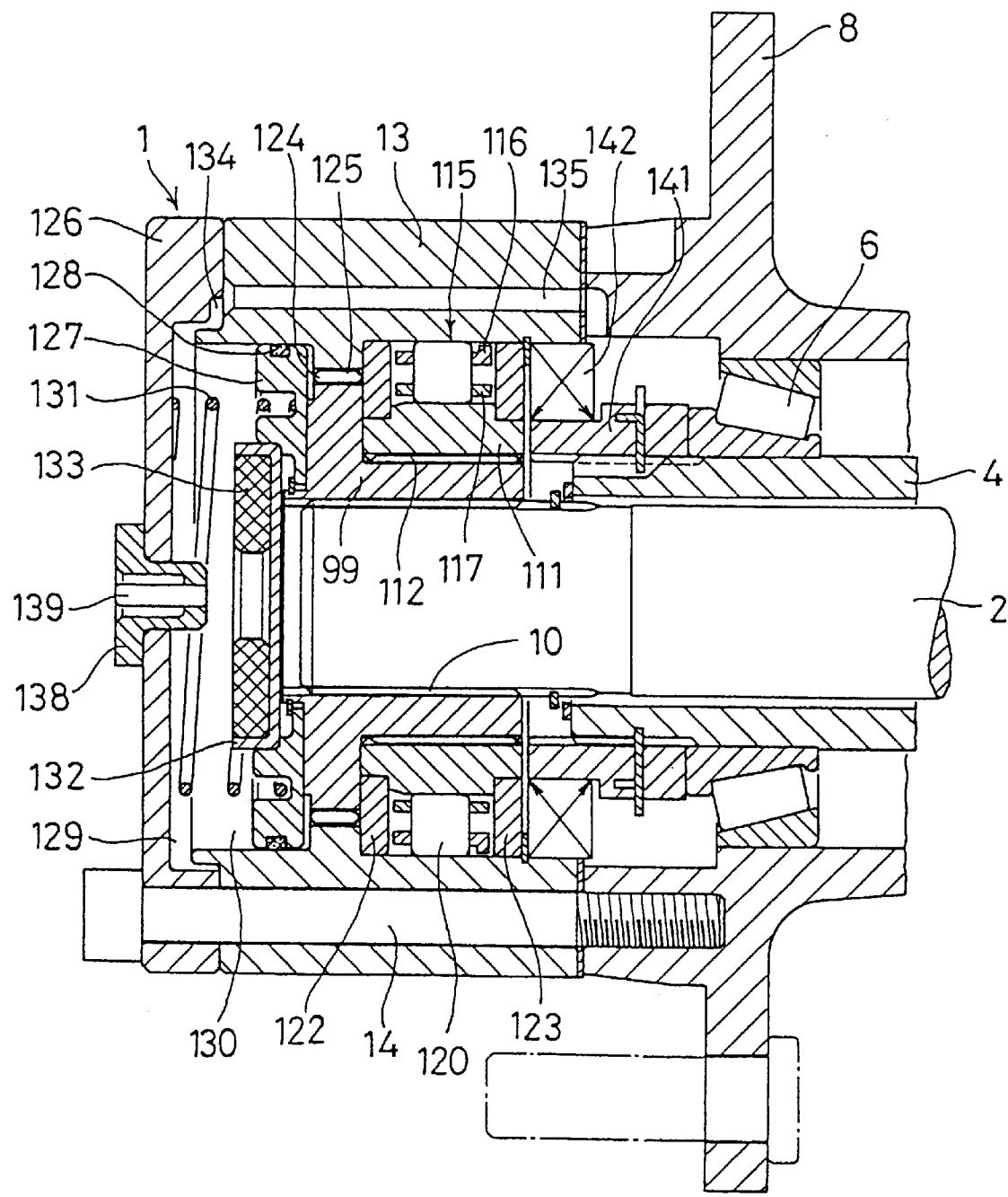
FIG. 20 is an enlarged vertical sectional view of a portion of the same in a four-wheel drive position.

As shown in FIGS. 19 and 20, a slide ring 99, which is one of two driving members of the hub clutch assembly 1, is nonrotatably but axially slidably mounted on an end of the front wheel axle 2 by means of serrations 10. An inner ring 111 which is the other driving member is nonrotatably but axially slidably mounted on the slide ring 99 through serrations 112.

An outer ring 13 as a driven member is rotatably mounted around the slide ring 99 and the inner ring 111. The outer ring 13 has its rear end fixed to an end face of the wheel hub 8 by a plurality of bolts 14. A one-way clutch 115 is mounted between the inner periphery of the outer ring 13 and the inner ring 111.

Figure 24:
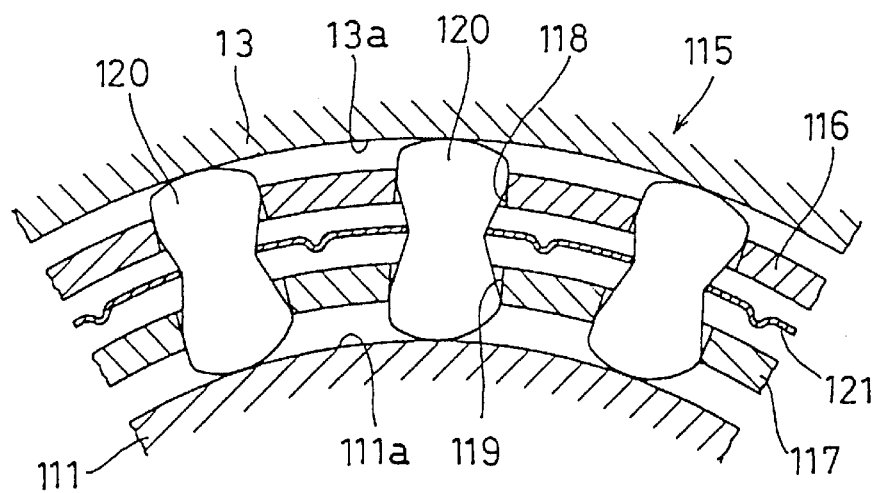
FIG. 24 is a vertical sectional view of the one-way clutch.

As shown in FIGS. 18 and 24, the one-way clutch 115 includes two annular retainers 116 and 117 having different diameters from each other and mounted between opposed cylindrical surfaces 111a and 13a of the inner ring 111 and the outer ring 13. A plurality of radially opposed pockets 118 and 119 are formed in the respective retainers 116 and 117. A sprag 120 is mounted in each pair of radially opposed pockets 118 and 119. A ribbon spring 121 (FIG. 24) biases the sprags 120 at all times to tilt them in one direction.

When the inner ring 111 (and thus the axle) begins rotating faster than the outer ring 13 (and thus the wheel hub), the sprags 120 are inclined until they engage the cylindrical surfaces 111a and 13a, so that torque is transmitted between the inner ring 111 and the outer ring 13. While the outer ring 13 is rotating faster than the inner ring 111, the outer ring 13 is allowed to free-run (overrun) relative to the sprags 120, so that no torque is transmitted. In this embodiment, the sprags are arranged to incline in such a direction that locks the one-way clutch 115 while the vehicle is moving ahead. Support metals 122 and 123 are disposed between the inner ring 111 and the outer ring 13 at both ends thereof.

A spacer 141 is fitted on the spindle 4 between the rear end of the inner ring 111 of the one-way clutch 115 and the tapered bearing 6. An oil seal 142 is provided between the spacer 141 and the inner periphery of the outer ring 13 near its rear end.

The slide ring 99 is axially movable relative to the front wheel axle 2 and the inner ring 111 and has an external gear 124 on its outer periphery at its front end. The outer ring 13 has an internal gear 125 on its inner periphery near the one-way clutch 115. By axially moving the slide ring 99, the external gear 124 can be brought into and out of mesh with the internal gear 125.

A lid 126 made of a magnetizable metal is mounted to the front end of the outer ring 13 to close its opening. A slider 127 as a coupling member is axially slidably mounted in the outer ring 13 near its front end.

The slider 127 is fixed to and axially moved together with the slide ring 99. It has a seal ring 128 on its outer periphery which is in sliding contact with the inner periphery of the outer ring 13. Outer and inner sealed chambers 129 and 130 are defined in the outer ring 13 on opposite sides of the slider 127.

A spring 131 is mounted in a compressed state between the slider 127 and the lid 126 to bias the slide ring 99 through the slider 127 at all times toward a position where the external gear 124 meshes with the internal gear 125. A magnet 133 is fixed to the rear end of the slider 127 through a case 132 at a position opposite to the lid 126.

When the slider 127 is moved outward until the external gear 124 gets out of mesh with the internal gear 125, the magnet 133 is attracted to the lid 126 overcoming the force of the spring 131 to keep the gears 124 and 125 out of mesh with each other. For this purpose, the magnet 133 is set to have a larger magnetic force than the spring force of the compressed spring 131.

Figure 21B:
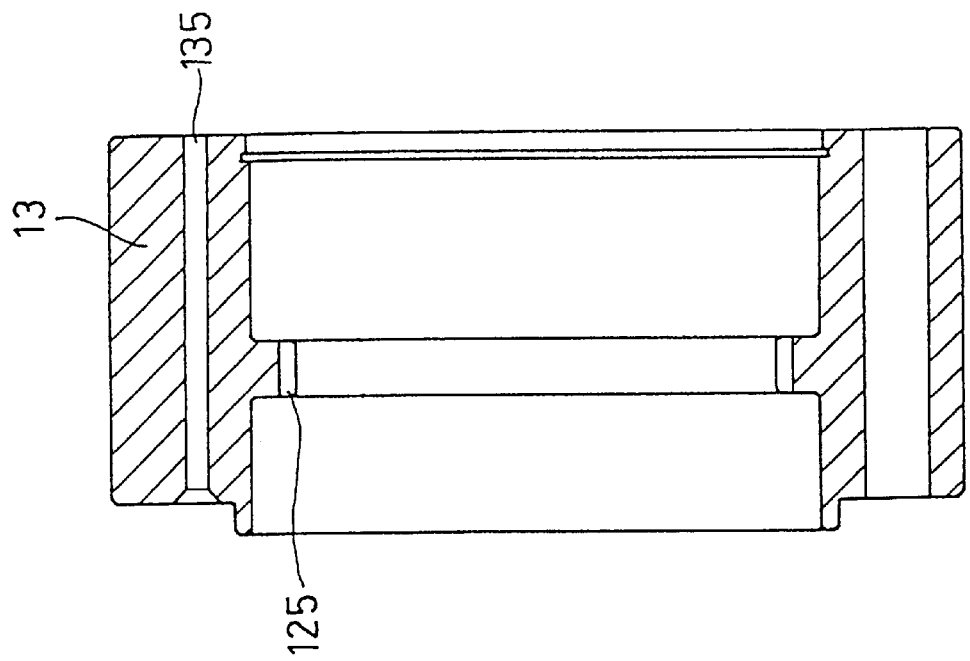
FIG. 21B is a vertical sectional view; of the outer ring of FIG. 21A.
Figure 21A:
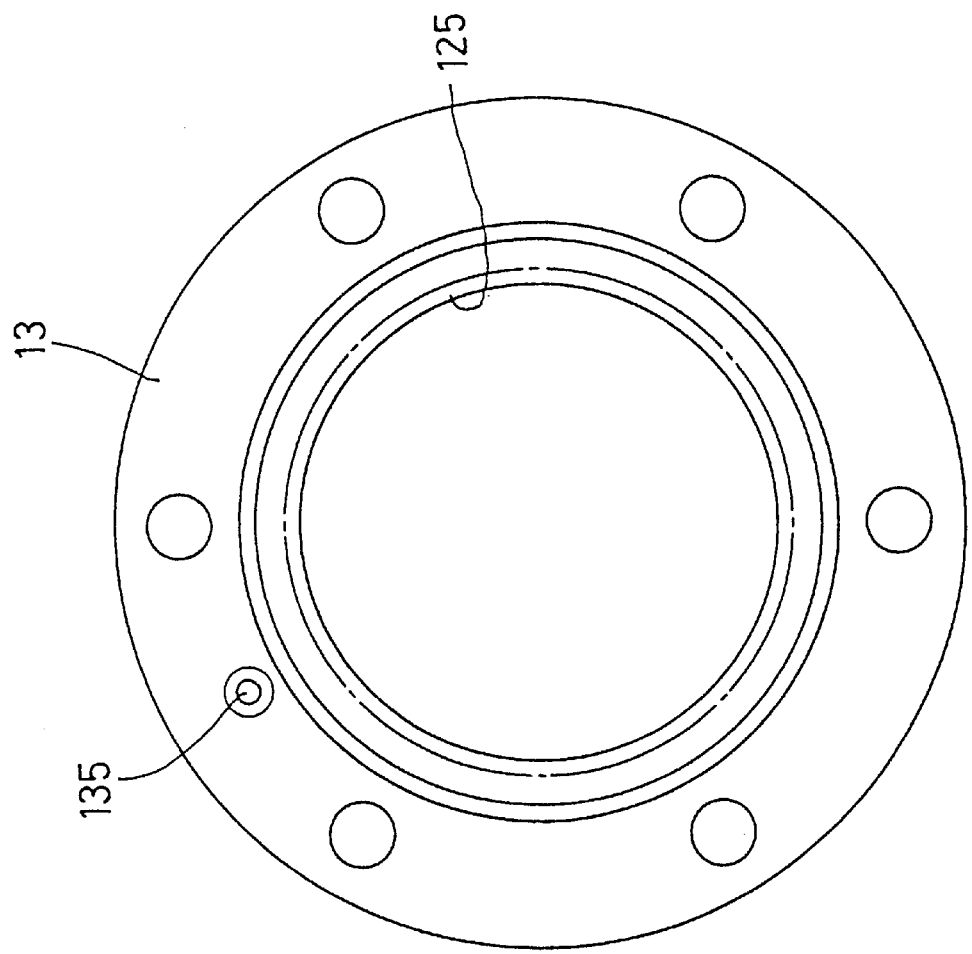
FIG. 21A is a front view of a outer ring.
Figure 23:
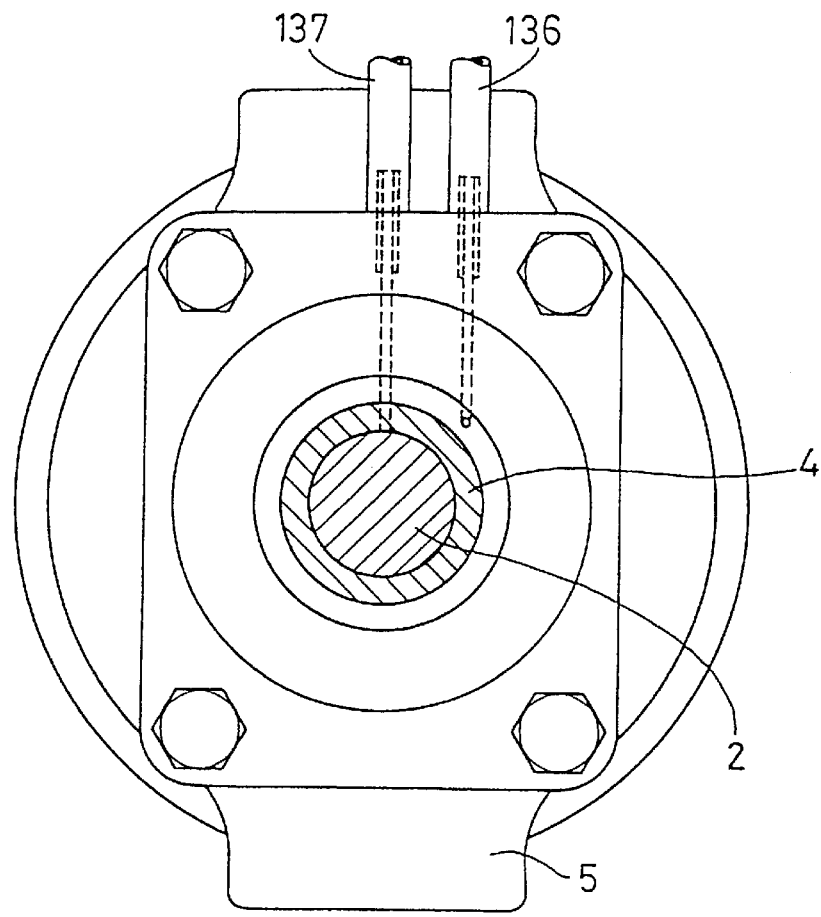
FIG. 23 is a vertical sectional view taken along line XXIII—XXIII of FIG. 18.

A means is provided to move the slider 127 to change over the drive mode between the four-wheel drive position and two-wheel drive position. As shown in FIG. 21A and 21B, this means includes an air passage 135 extending axially through the outer ring 13 to communicate with the outer chamber 129 through a cutout 134 of the lid 126 (FIG. 2). As shown in FIGS. 18 and 23, the air passage 135 communicates with an air source (not shown) through the space between the spindle 4 and the wheel hub 8, the interior of the tapered bearings 6 and 7 in this space, and an air pipe 136. By remote control e.g. from the transfer of the four-wheel drive vehicle, a negative pressure or a positive pressure is supplied from the air source.

The inner chamber 130 communicates with the air source through air passages, i.e. gaps between serrations 112 coupling the slide ring 99 and the inner ring 111 together, and the gap between the front wheel axle 2 and the spindle 4 , and an air pipe 137 connected to the rear end of the spindle 4 to communicate with the gaps.

A pin case 138 extends through and is fixed to the center of the lid 126. A pin 139 is airtightly and axially movably supported by the pin case 138. If air should leak through e.g. the air passage while the driving mode is in the two-wheel drive position, the driver pushes in the pin 139 to move the case 132 and thus to forcibly separate the magnet 133 from the lid 126. Once the magnet 133 separates from the lid. The slider 127 is moved by the spring 131 until the external gear 124 meshes with the internal gear 125. Thus, it is possible to change over the driving mode to the four-wheel position even if the remote-controlled changeover means should fail (fail-safe function).

Figure 25:
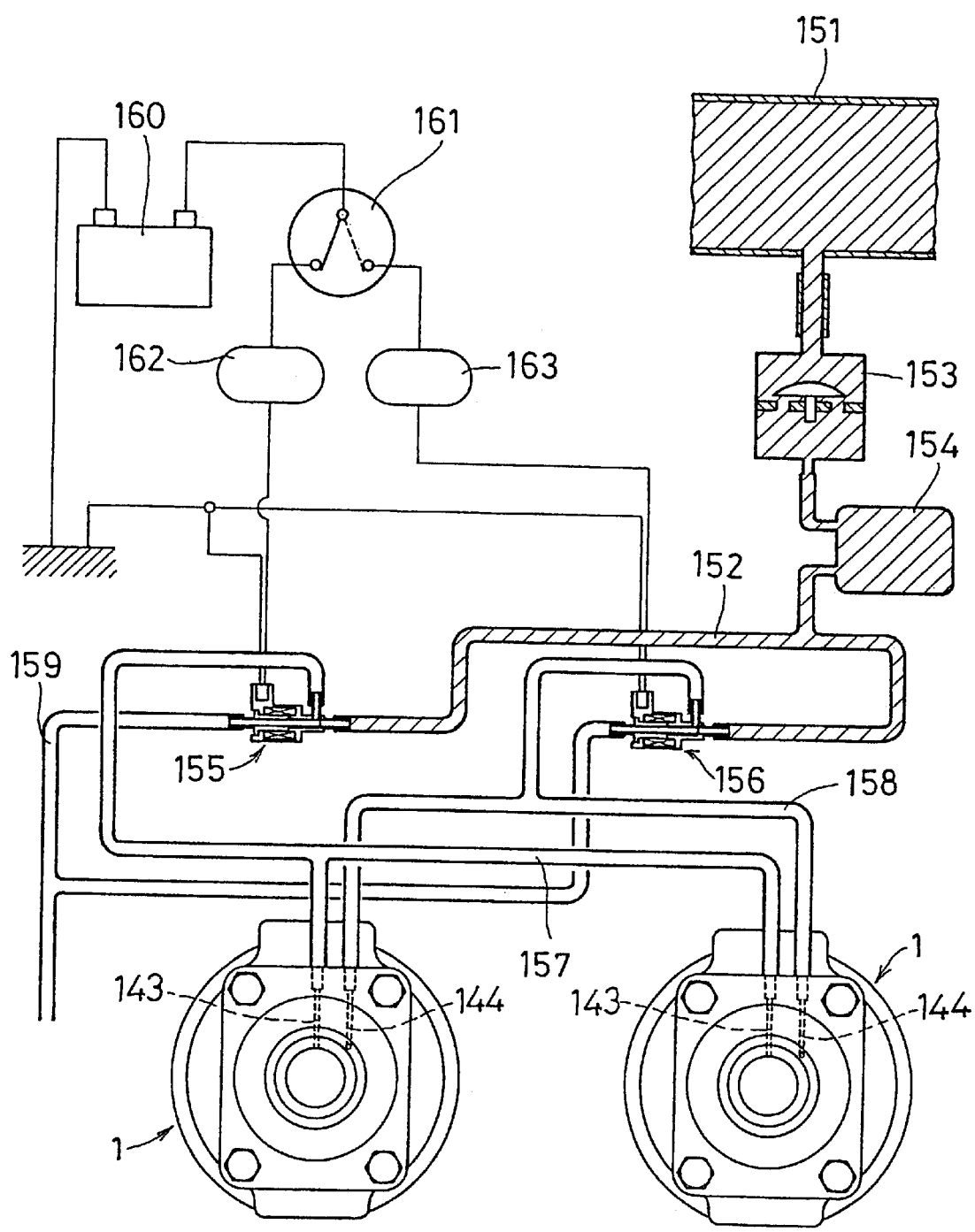
FIGS. 25–27 are schematic views showing the operation of the sixth embodiment.

FIG. 25 shows a control means connected to the first and second air passages 143 and 144 for changing over the driving mode between the two-wheel and four-wheel drive positions.

This control means has a negative pressure source 151 which may be an engine intake manifold, a pump or a compressor. A negative pressure pipe 152 connected to the negative pressure source 151 is provided with a check valve 153 and a negative pressure tank 154. The negative pressure pipe has bifurcated ends connected to a first solenoid valve 155 and a second solenoid valve 156. The negative pressure tank 154 is used to replenish negative pressure if no sufficient negative pressure is produced by the negative pressure source 151. It will be especially useful if the negative pressure source 151 is an intake manifold because no negative pressure is produced in an intake manifold while the engine is being accelerated.

The first solenoid valve 155 is used to change over the driving mode from the two-wheel drive position to the four-wheel drive position. A first pipe 157,branching from the solenoid valve 155 is connected at its leading end with the second air passage 143 at its portion 143c at the rear end of the spindle 4.

The second solenoid valve 156 is used to change over the driving mode from the four-wheel drive position to the two-wheel drive position. A second pipe 158 branching from the solenoid valve 156 is connected at its leading end with the first air passage 144 at its portion 144c at the rear end of the spindle 4.

Pipes 159 leading to the atmosphere are connected to the outlet ends of the solenoid valves 155 and 156. When the first solenoid valve 155 is activated, the negative pressure pipe 152 and the first pipe 157 are brought into communication with each other through the valve 155. When deactivated, it shuts off communication between them, while allowing communication between the first pipe 157 and the pipe 159 leading to the atmosphere.

When the second solenoid valve 156 is activated, the negative pressure pipe 152 and the second pipe 158 are brought into communication with each other through the valve 156. When deactivated, it shuts off communication between them, while allowing communication between the second pipe 158 and the pipe 159 leading to the atmosphere.

A circuit connecting a power source 160 to the solenoid valves 155 and 156 includes a hub lock changeover switch 161, a first timer 162 for the first solenoid valve 155 and a second timer 163 for the second solenoid valve 156 so that the solenoid valves 155 and 156 can be controlled independently of each other. By operating the switch 161, the power source 160 can be selectively connected to the solenoid valve 155 or 156. The timers 162 and 163 activate the respective solenoid valves 155 and 156 to apply a negative pressure to the slider 127 for a predetermined time period needed to change over the driving mode from the four-wheel drive position to the two-wheel drive position and vice versa.

The operation of the hub clutch assembly of the sixth embodiment as mounted on a vehicle shall be described below.

In the two-wheel drive position shown in FIGS. 18 and 19, the magnet is attracted to the lid 126 to keep the slider 127 and the slide ring 99 pushed outward, while compressing the spring 131. In this state, the external gear 124 is out of mesh with the internal gear 125.

The one-way clutch 115 is thus allowed to free-run with the axle (driving member) and the wheel hub (driven member) completely separated from each other. Thus, no torque is transmitted from the wheel hub to the axle.

In this state, neither the driving force from the engine nor the rotation of the front wheels is transmitted to the front wheel axle 2, which is separated from the transfer. This means that the drive train from the transfer to the front wheel axle stops during the two-wheel drive mode with only the rear wheels being driven.

In this state, as shown in FIG. 25, both the first and second solenoid valves 155 and 156 are deactivated, so that their spools are moved to a position to shut off communication between the negative pressure pipe 152 and the first and second pipes 157 and 158. Thus, the first and second air passages 143 and 144, as well as the airtight chambers 129 and 130 are at the atmospheric pressure.

Figure 26:
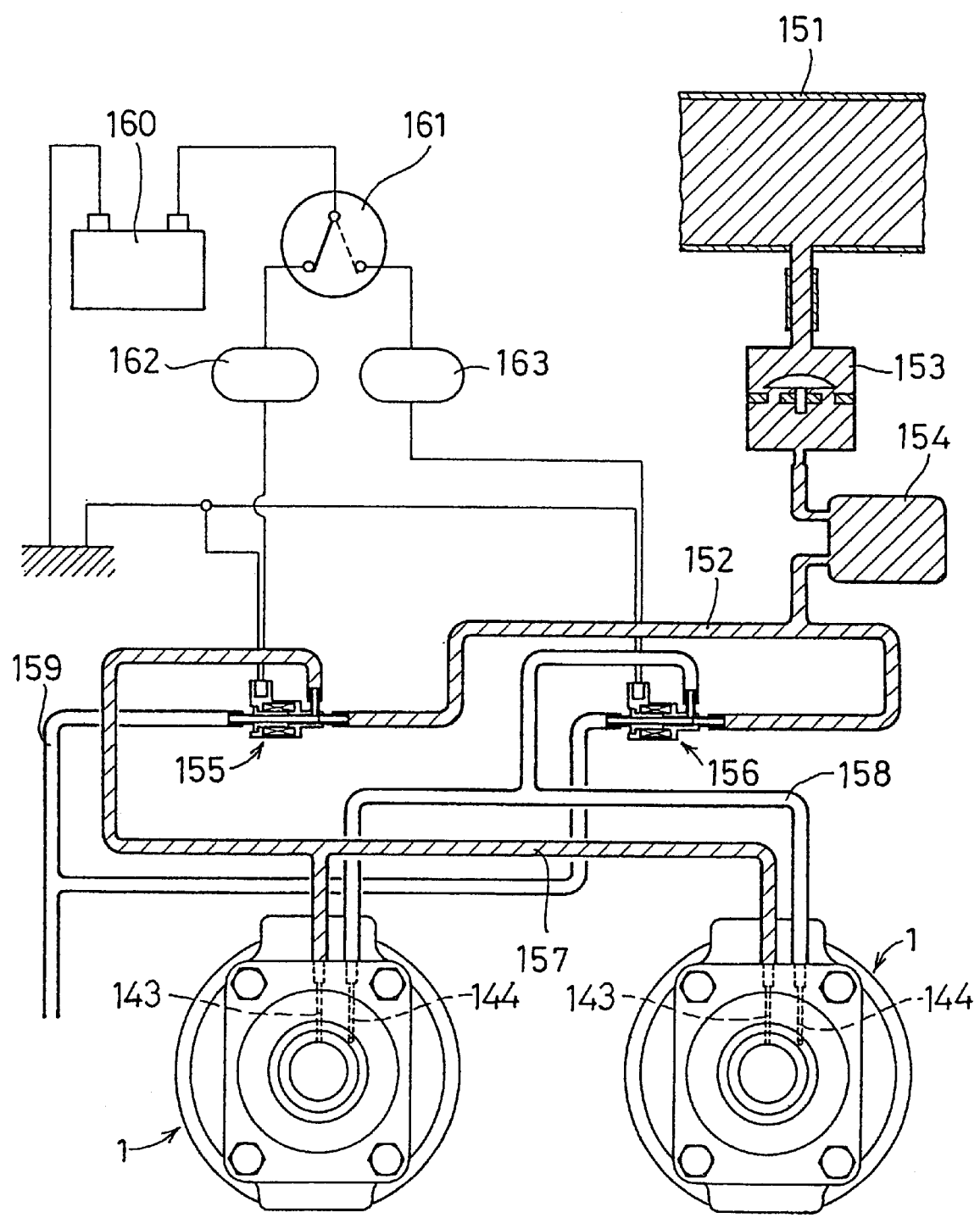

When the car has moved onto a road with a low friction coefficient such as a snow-covered road in this state, it is necessary to change over the drive mode from the two-wheel drive position to the four-wheel drive position. For this purpose, as shown in FIG. 26, the hub lock switch 161 is operated to the four-wheel drive position to activate the first solenoid valve 155 through the first timer 162. The negative pressure pipe 155 is thus brought into communication with the first pipe 157, so that the negative pressure produced by the negative pressure source 151 is transmitted to the inner airtight chamber 130 through the first pipe 157 and the second air passage 143.

That is, air in the airtight chamber 130 is sucked out, so that the chamber is put under a negative pressure. The negative pressure pulls the slider 127 to separate the magnet 133 from the lid 126 against the attraction force of the magnet. Once the magnet separates from the lid, the slider 127 and the slide ring 99 are pushed inwardly by the spring 131 until the external gear 124 meshes with the internal gear 125.

In this state, the front wheel axle 2 and the outer ring 13 are locked together (four-wheel drive state), so that not only the driving force but also the braking force is transmitted from the engine to all the four wheels.

When the predetermined time set in the timer 162 has elapsed, the first solenoid valve 155 is deactivated, so that the negative pressure pipe 152 is shut off from the first pipe 157 by the valve 155, while the first pipe 157 is brought into communication with the pipe 159 leading to the atmosphere. The airtight chamber 130 is thus put under the atmospheric pressure.

Figure 27:
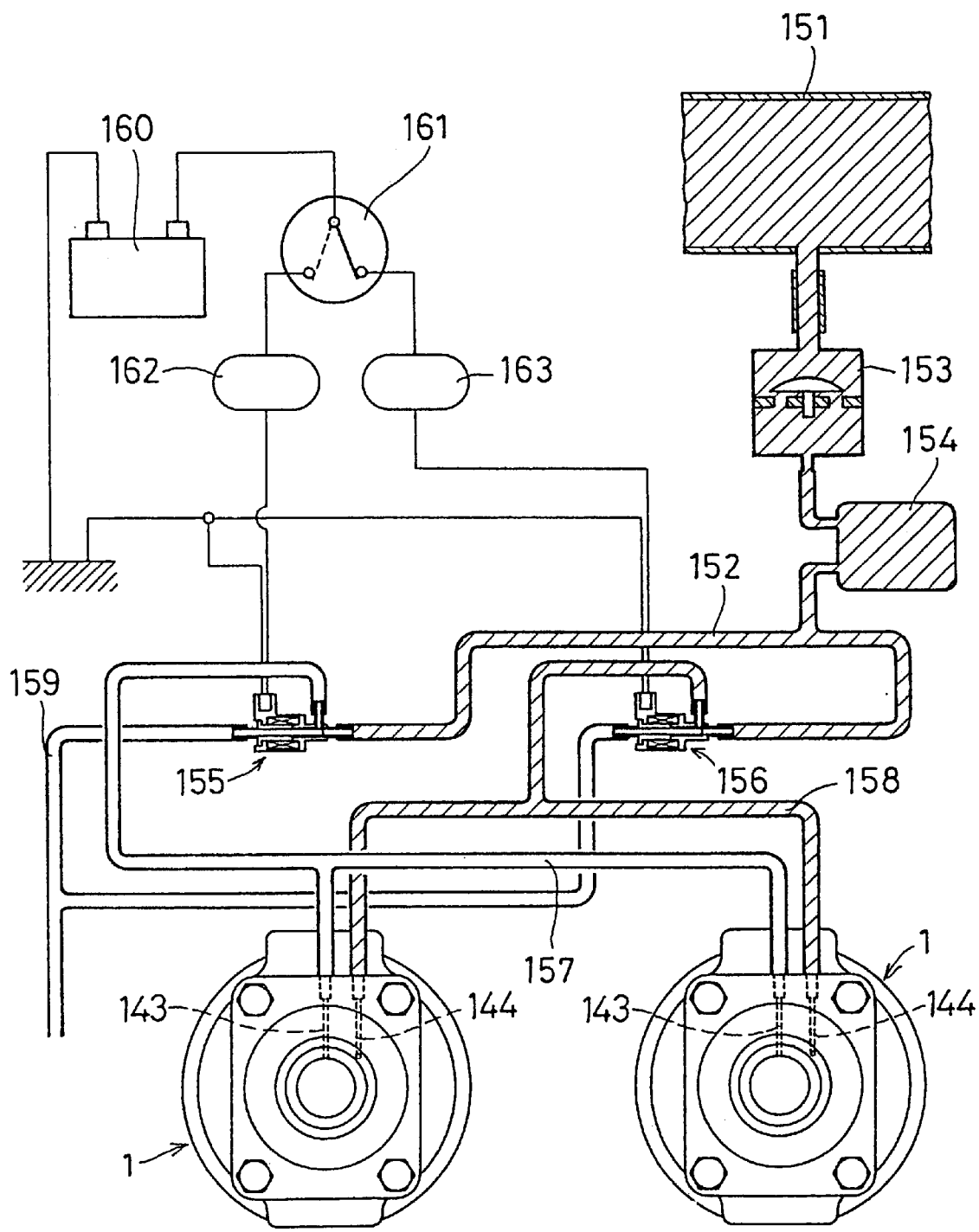

In order to change over the drive mode from the four-wheel drive position to the two-wheel drive position, as shown in FIG. 27, the hub lock switch 161 is moved to the two-wheel drive position to activate the second solenoid valve 156 through the second timer 163. The negative pressure pipe 155 is thus brought into communication with the second pipe 158, so that the negative pressure produced by the negative pressure source 151 is transmitted to the outer airtight chamber 129 through the second pipe 158 and the first air passage 144.

The negative pressure in the outer airtight chamber 129 pulls the slider 127 and the slide ring 99 outwardly until the magnet 133 sticks to the lid 126 and the external gear 124 separates from the internal gear 125.

When the predetermined time set in the second timer 163 has elapsed, the second solenoid valve 156 is deactivated, so that the negative pressure pipe 152 is shut off from the second pipe 158 by the valve 156, while the second pipe 158 is brought into communication with the pipe 159 leading to the atmosphere. The airtight chamber 129 is thus put under the atmospheric pressure.

The driving mode can be changed over between the four-wheel drive position and the two-wheel drive position by creating a negative pressure or a positive pressure in one of the chambers 129 and 130 on both sides of the slider 127. The two-wheel drive position is maintained by keeping the magnet 133 stuck magnetically on the lid 126. The four-wheel drive position is maintained by the biasing force of the spring 131.

Thus, once the driving position is changed over, it is no longer necessary to maintain a negative pressure or a positive pressure. Thus, as soon as the driving position is changed over, the pressure in the air passage can be brought back to the atmospheric pressure. Since a negative pressure or a positive pressure acts on the seal portions of the hub and the spindle only for a very short time, their durability is kept high.

The timers 162 and 163 and the solenoid valves 155 and 156 are not activated simultaneously. If the hub lock switch 161 is operated while one of the solenoids is being activated, the switch 161 never changes over.

In any of the embodiments, it is possible to change over the driving position either by creating a negative pressure in one of the two chambers 129 and 130 or by creating a positive pressure in the other chamber.

What is claimed is:

1. A hub clutch assembly comprising a driving member coupled to a wheel axle, a driven member coupled to a wheel hub, said driving member and said driven member being mounted one around the other so as to be rotatable relative to each other, engaging elements mounted between said driving member and said driven member and adapted to engage both said driving member and said driven member when said driving member and said driven member rotate relative to each other, a retainer for said engaging elements mounted between said driving member and said driven member so as to be rotatable relative to both said driving member and said driven member, a torque imparting means coupled to said retainer for rotating said retainer relative to said driving member to move said engaging elements to an operative engageable position, a coupling member mounted between said retainer and said driven member so as to be movable under a fluid pressure between a first position where said retainer and said driven member are coupled together through said coupling member and a second position where said retainer and said driven member are separated from each other, a spring for resiliently holding said coupling member in one of said first and second positions, and a magnet for magnetically holding said coupling member in take other of said first and second positions.

2. A hub clutch assembly as claimed in claim 1 wherein said coupling member is mounted on one end of said wheel hub so as to be movable axially of said wheel axle, wherein two chambers are defined on opposite sides of said coupling member, and wherein said hub clutch assembly further comprises a means for axially moving said coupling member by creating a negative or positive fluid pressure in one of said two chambers only while said coupling member is being moved between said first position and said second position.

3. A hub clutch assembly as claimed in claim 2 wherein said magnet is fixed to one end of said coupling member so as to be attracted to and stuck on one of said driven member and said driving member, and wherein said magnet has an attraction force greater than a resilience of said spring.

4. A hub clutch assembly as claimed in claim 1 wherein said magnet is fixed to one end of said coupling member so as to be attracted to and stuck on one of said driven member and said driving member, and wherein said magnet has an attraction force greater than a resilience of said spring.

5. A hub clutch assembly as claimed in claim 1, wherein said coupling member is a slider.

* * * * *